(12) United States Patent
Motomori

(10) Patent No.: US 7,355,830 B2
(45) Date of Patent: Apr. 8, 2008

(54) OVERCURRENT PROTECTION DEVICE

(75) Inventor: Mikio Motomori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 566 days.

(21) Appl. No.: 10/992,104

(22) Filed: Nov. 19, 2004

(65) Prior Publication Data

US 2005/0111149 A1    May 26, 2005

(30) Foreign Application Priority Data

Nov. 21, 2003    (JP)    ............................. 2003-391825

(51) Int. Cl.
*H02H 3/00*    (2006.01)

(52) U.S. Cl. .................................... 361/93.1

(58) Field of Classification Search ................ 361/93.1
See application file for complete search history.

(56) References Cited

U.S. PATENT DOCUMENTS

| | | | | |
|---|---|---|---|---|
| 5,612,610 | A | * | 3/1997 | Borghi et al. ............... 323/222 |
| 5,745,352 | A | * | 4/1998 | Sandri et al. ................. 363/41 |
| 2004/0201935 | A1 | * | 10/2004 | Yamamoto ................. 361/93.1 |

FOREIGN PATENT DOCUMENTS

| | | |
|---|---|---|
| JP | 07-177731 | 7/1995 |
| JP | 2000-245141 | 9/2000 |
| JP | 2002-27737 | 1/2002 |

OTHER PUBLICATIONS

Office Action Dated Jul. 18, 2006.

* cited by examiner

*Primary Examiner*—Ronald W. Leja
(74) *Attorney, Agent, or Firm*—McDermott Will & Emery LLP

(57) ABSTRACT

The switching regulator comprises a main switch, a rectifier switch, an RS-flipflop, a judging unit, an edge pulse generator, a second prohibiting unit, and a reference voltage source. When a voltage drop caused due to an on-resistance of the main switch exceeds a predetermined value, the judging unit sets a set signal of the RS-flipflop at a high level, and thereby an overcurrent is cut off. The edge pulse generator monitors a gate voltage of the rectifier switch, and sets a prohibition signal at a high level for a predetermined time period from the trailing edge. Then, the second prohibiting unit sets the set signal at a low level, and prohibits cutting the overcurrent off. Herewith, the likelihood that the main switch will be destroyed by the overcurrent can be reduced.

8 Claims, 21 Drawing Sheets

FIG.18 CURRENT/VOLTAGE WAVEFORMS AT OVERCURRENT OCCURRENCE

OVERCURRENT PROTECTION DEVICE

CROSS-REFERENCE TO RELATED APPLICATIONS

This application is based on application No. 2003-391825 filed in Japan, the contents of which are hereby incorporated by reference.

BACKGROUND OF THE INVENTION

1. Field of the Invention

The present invention relates to an overcurrent protection device that is used with a power supply (e.g. a DC-DC converter) supplying an intended direct-current voltage to a load circuit by controlling the duty-ratio of a main switch (e.g. a Field Effect Transistor, or an FET) and controls the output current by reducing the on-time of the main switch when an overcurrent flows through the main switch in the on state.

2. Related Art

A switching regulator supplies an intended direct-current voltage to a load circuit by controlling the duty-ratio of the main switch. One such switching regulator is a Pulse Width Modulation (PWM) switching regulator, and there are two types for the PWM switching regulators: a buck type converter and a boost type converter. The following will give an account of a switching regulator using a PWM buck type converter.

When the on-time and off-time of the main switch for each cycle are $T_{on}$ and $T_{off}$, respectively, and the input voltage of the switching regulator is $V_{in}$, the output voltage $V_{out}$ is found by the following equation:

$$V_{out} = T_{on}/(T_{on}+T_{off}) \cdot V_{in} \quad (1).$$

In order to keep the output voltage $V_{out}$ constant, in the PWM, the ratio of the on- and off-times of the main switch is adjusted so that the error voltage ($V_{out}-V_{ref}$), which is a difference between the output voltage $V_{out}$ and the reference voltage $V_{ref}$, becomes small. In the event that an overcurrent is detected, the main switch is protected from breakdown by controlling the output current by reducing the on-time $T_{on}$ and thereby lowering the output voltage $V_{out}$.

Additionally, a switching regulator has been suggested that stops the PWM operations when an overcurrent is detected, instead of reducing the on-time $T_{on}$ (cf. Japanese Laid-Open Patent Application Publication No. 2002-27737). FIG. 1 is a circuit diagram illustrating a configuration of the switching regulator (a step-down DC-DC converter). As shown in FIG. 1, the switching regulator 19 comprises an overcurrent protection device 1900, a main switch 1901, a rectifier switch 1902, a controller 1903, an AND circuit 1904, an inductor 1905, a capacitor 1906, a control terminal 1907, an input terminal 1908, an output terminal 1909, and an edge pulse generator 1910. The main switch 1901 is a P-channel MOSFET (Metal Oxide Semiconductor Field Effect Transistor), and the rectifier switch 1902 is an N-channel MOSFET.

The overcurrent protection device 1900 includes an RS-flipflop 1900a, a comparator 1900b, and a constant voltage source 1900c. The constant voltage source 1900c is made up of a resistor 1900c1 and a constant current source 1900c2. The edge pulse generator 1910 includes a switch 1910a, a NOR circuit 1910b, NOT circuits 1910c and 1910f, a capacitor 1910d, and a resistor 1910e.

The main current path of the switching regulator 19 is from the input terminal 1908 to the output terminal 1909 through the main switch 1901 and the inductor 1905. A load circuit (omitted from FIG. 1) is connected to the output terminal 1909. A voltage $V_{in}$ is applied to the input terminal 1908.

The control signal that controls the switching regulator 19 under PWM control is input to the edge pulse generator 1910 from the control terminal 1907. By the control signal, the on/off of the main switch 1910 is controlled so as to alternate with the rectifier switch 1902 for each cycle. The main switch 1901 is an FET.

The switching regulator 19 is a synchronous converter, and after the main switch 1901 is turned off and then a dead-time period (i.e. a time period required to avoid having both the main switch 1901 and the rectifier switch 1902 conduct at the same time) elapses, the rectifier switch 1902 is turned on. Herewith, energy stored in the inductor 1905 is supplied to the load circuit as a current. The current path for the rectification of the switching regulator 19 is from the inductor 1905 to the ground through the output terminal 1909 and the load circuit.

The inductor 1905, together with the capacitor 1906, makes up an LC filter. Herewith, a ripple in the output voltage is reduced and then the output current is smoothed.

The edge pulse generator 1910 inputs a reset signal synchronizing with the control signal to a reset terminal of the RS-flipflop 1900a. A pulse width $T_{reset19}$ of the reset signal is determined by a time constant of an RC integration circuit composed of the capacitor 1910d and the resistor 1910e.

A set signal is input to a set terminal of the RS-flip-flop 1900a from the comparator 1900b. For each cycle, the RS-flip-flop 1900a is set by the set signal and reset by the reset signal. Due to the rising and trailing edges of the pulses of the set and reset signals, the reverse output /Q of the RS-flipflop 1900a repeats the state transition between a high level and a low level on a cyclic basis.

The following explains the case in which a positive logic is used for a logic circuit.

The AND circuit 1904 inputs to the controller 1903 a signal which is a product of the reverse output /Q and the control signal. According to the signal, the controller 1903 drives the main switch 1901 and the rectifier switch 1902 alternately turning them on/off so that there is no time period in which these two switches are on at the same time.

The overcurrent protection device 1900 monitors a current flowing through the main switch 1901 by comparing a voltage drop $\Delta V_{(t)}$ between drain and source of the main switch 1901 and a reference voltage $\Delta V_{ref}$.

FIG. 2 is a timing chart showing a normal operation of the switching regulator 19 over one PWM cycle. In FIG. 2, the horizontal axis indicates time, and the vertical axis indicates a voltage or a current. In the present specification, "H" and "L" denote a high and a low level, respectively.

Waveform 2001 shows voltage levels of the control signal, Waveform 2002 shows gate-voltage levels of the rectifier switch 1902, Waveform 2003 shows gate-voltage levels of the main switch 1901, Waveform 2004 shows the amount of the current flowing through the inductor 1905, Waveform 2005 shows levels of the output voltage provided from a circuit composed of the main switch 1901 and the rectifier switch 1902, Waveform 2006 shows voltage levels of the set signal, Waveform 2007 shows voltage levels of the reset signal, and Waveform 2008 shows voltage levels of the reverse output /Q.

As shown in FIG. 2, at a time $t_{190}$ the control signal switches from L to H (Waveform 2001). In synchronization with this, the reset signal switches to H (Waveform 2007) and the reverse output /Q switches to H (Waveform 2008). Herewith, the switching operations of the main switch 1901 and the rectifier switch 1902 for one cycle are started.

After a delay time duration $Td_{191}$ elapses, the rectifier switch 1902 is turned off (Waveform 2002). Then, after a delay time duration $Td_{192}$ elapses, the main switch 1901 is turned on (Waveform 2003). Note that the delay time duration $Td_{191}$ is determined by a circuit of the controller 1903. The delay time duration $Td_{192}$ is also determined by the circuit of the controller 1903, and this is a dead-time period provided to avoid having both the main switch 1901 and the rectifier switch 1902 conduct at the same time.

Subsequently, during a risetime duration $Td_{193}$, the output voltage $V_{(t)}$ provided from the circuit composed of the main switch 1901 and the rectifier switch 1902 rises from 0 to $V_{in}$ (Waveform 2005). Herewith, the inductor current $I_{(t)}$ flows (Waveform 2004) and is supplied to the load circuit.

In this case, as shown in the following equation, the inductor current $I_{(t)}$ increases with a slope defined by a potential difference $(V_{in}-V_{out})$ between the input terminal 1908 and the output terminal 1909, and an inductance value $L_{1905}$ of the inductor 1905.

$$I_{(t)}=(V_{in}-V_{out})/L_{1905} \cdot (t-t_{191}) \qquad (2).$$

Here, a time $t_{191}$ is a time when the current $I_{(t)}$ starts increasing, and is defined by:

$$t_{191}=t_{190}+Td_{191}+Td_{192}.$$

When the current $I_{(t)}$ flows through the main switch 1901, a voltage drop $\Delta V_{(t)}$ occurs (Waveform 2005) between drain and source of the main switch 1901, due to an on-resistance $R_{on1901}$ of the main switch 1901 and the current $I_{(t)}$. This voltage drop $\Delta V_{(t)}$ can be found by the following equation:

$$\Delta V_{(t)}=V_{in}-V_{(t)} \qquad (3).$$

The comparator 1900b monitors whether an overcurrent is flowing through the main switch 1901 by comparing the voltage drop $\Delta V_{(t)}$ and the reference voltage $\Delta V_{ref}$.

As shown in FIG. 2, before a time $(t_{191}+Td_{193})$, the voltage drop $\Delta V_{(t)}$ becomes larger than the reference voltage $\Delta V_{ref}$ (i.e. $\Delta V_{(t)} > \Delta V_{ref}$). During the period between the time $(t_{191}+Td_{193})$ and a time $(t_{193}+Td_{195})$, the voltage drop $\Delta V_{(t)}$ is equal to or smaller than the reference voltage $\Delta V_{ref}$ ($\Delta V_{(t)} \leq \Delta V_{ref}$) (Waveform 2005). Therefore, before the time $(t_{191}+Td_{193})$, the comparator 1900b judges that an overcurrent is flowing through the main switch 1901 and switches the set signal to H. After the time $(t_{191}+Td_{193})$, the comparator 1900b keeps the set signal at H until a delay time duration $Td_{194}$ elapses. The delay time duration $Td_{194}$ is a circuit delay time of the comparator 1900b.

However, since an overcurrent is in fact not flowing, the edge pulse generator 1910 keeps the reset signal at H until a margin $Tm_{19}$ elapses after a time $t_{192}$ (Waveform 2007). From the time $t_1$ go onward, a duration of time while the reset signal is set at H is referred to hereinafter as "$T_{reset19}$".

At a time $t_{193}$, the control signal switches to L (Waveform 2001). Then, after a delay time duration $Td_{195}$ elapses, the gate voltage of the main switch 1901 switches to H (Waveform 2003), and the main switch 1901 is turned off.

After a delay time duration $Td_{197}$ elapses, the gate voltage 102 of the rectifier switch 1902 switches to H (Waveform 2002), and the rectifier switch 1902 is turned on. Hereby, energy stored in the inductor 1905 is supplied as a current to the load circuit through the rectifier switch 1902.

Note that the above delay time duration $Td_{195}$ is a circuit delay time of the controller 1903. The delay time duration $Td_{197}$ is also a circuit delay time of the controller 1903, and is a dead-time period of the main switch 1901 and the rectifier switch 1902.

As described above, once the main switch 1901 is turned off, the voltage drop $\Delta V_{(t)}$ largely exceeds the reference voltage $\Delta V_{ref}$ (Waveform 2005). Accordingly, the comparator 1900b judges that an overcurrent is flowing though the main switch 1901, and then the set signal is switched from L to H with a delay for a circuit delay time (Waveform 2006). Here, the circuit delay time is shorter than the delay time duration $Td_{197}$.

Herewith, the reverse output /Q switches to L (Waveform 2008), and the control signal is kept at L until the signal switches to H again.

FIG. 3 is a timing chart showing an operation of the switching regulator 19 performed at the time when an overcurrent occurs. In FIG. 3, the horizontal axis indicates time, and the vertical axis indicates a voltage or a current. Waveform 2101 shows voltage levels of the control signal, Waveform 2102 shows gate-voltage levels of the rectifier switch 1902, Waveform 2103 shows gate-voltage levels of the main switch 1901, Waveform 2104 shows the amount of the current flowing through the inductor 1905, Waveform 2105 shows levels of the output voltage provided from the circuit composed of the main switch 1901 and the rectifier switch 1902, Waveform 2106 shows voltage levels of the set signal, Waveform 2107 shows voltage levels of the reset signal, and Waveform 2108 shows voltage levels of the reverse output /Q.

Owing to short-circuiting of the load circuit and like, when an overcurrent flows through the main switch 1901 and thereby the voltage drop $\Delta V_{(t)}$ exceeds the reference voltage $\Delta V_{ref}$ (Waveform 2105), the comparator 24 judges that an overcurrent is flowing through the main switch 1901 and switches the set signal to H (Waveform 2106). Here, a case in which the comparator 1900b keeps the set signal constantly at H will be explained (Waveform 2106).

As described above, during the time duration $T_{reset19}$, the PWM operations are continued regardless of the set signal. After the time duration $T_{reset19}$ elapses, the reset signal switches from H to L and thereby the RS-flipflop 1900a is reset. Here, since the set signal is at H, the reverse output /Q switches from H to L. Hereby, the main switch 1901 is turned off and then the overcurrent is cut off. As a result, the main switch 1901 is protected from breakdown caused by the overcurrent.

In order to prevent an erroneous detection of the overcurrent in the normal operation, the time duration $T_{reset19}$ must be set longer than the period between the times $t_{190}$ and $t_{192}$ as described above. The period between the times $t_{190}$ and $t_{192}$ is equal to the total sum of the delay time durations $Td_{191}$, $Td_{192}$, $Td_{193}$, and $Td_{194}$. Therefore, the time duration $T_{reset19}$ has to satisfy the following inequality:

$$T_{reset19} > Td_{191} + Td_{192} + Td_{193} + Td_{194} \qquad (4).$$

In order to prevent the erroneous detection of the overcurrent in this manner, a period $T_{on(min)19}$ during which the main switch 1901 is kept on (hereinafter, "minimum on-time") arises whether or not an overcurrent is flowing through the main switch 1901. This minimum on-time $T_{on(min)19}$ can be found by:

$$T_{on(min)19} = T_{reset19} - Td_{191} - Td_{192} + Td_{196} \qquad (5).$$

where $Td_{196}$ is a duration of time from when the reset signal switches from H to L until the main switch 1901 is turned off (see, FIG. 3).

The following inequality can be derived from the inequality (4) and the equation (5):

$$T_{on(min)19} > Td_{193} + Td_{194} + Td_{196} \qquad (6).$$

Namely, the minimum on-time $T_{on(min)19}$ has a lower limit, and is always larger than the value of the right hand side of the inequality (6).

However, when the RC time constant circuit, which determines the time duration $T_{reset19}$, in the edge pulse generator 1910 is integrated on a semiconductor substrate, the variations in the diffusion resistance and the temperature fluctuation of the integrated RC time constant are around +200% to −50%. This causes variations in the time duration $T_{reset19}$. Additionally, by the same token, variations in each of the time durations $Td_{191}$, $Td_{192}$, $Td_{193}$ and $Td_{194}$ arise.

When variations in the time durations $T_{reset19}$, $Td_{191}$, $Td_{192}$, $Td_{193}$ and $Td_{194}$ are $\delta T_{reset19}$, $\delta Td_{191}$, $\delta Td_{192}$, $\delta Td_{193}$ and $\delta Td_{194}$, respectively, $\delta T_{reset19}$ has inequality:

$$\delta T_{reset19} > \delta Td_{191} + \delta Td_{192} + \delta Td_{193} + \delta Td_{194} \qquad (7),$$

where $\delta T_{reset19}$, $\delta Td_{191}$, $\delta Td_{192}$, $\delta Td_{193}$, and $\delta Td_{194}$ are all positive numbers.

In order to prevent an erroneous detection of the overcurrent regardless of these variations, it is required to include the margin $Tm_{19}$ in the time duration $T_{reset19}$.

$$T_{reset19} = Td_{191} + Td_{192} + Td_{193} + Td_{194} + Tm_{19} \qquad (8).$$

Furthermore, according to the equations (5) and (8), the minimum on-time $T_{on(min)19}$ has equation:

$$T_{on(min)19} = Td_{193} + Td_{194} + Td_{196} + Tm_{19} \qquad (9).$$

Since $Tm_{19}$ must be larger than at least $\delta T_{reset19}$, $Tm_{19}$ has to satisfy the following inequality:

$$Tm_{19} > \delta Td_{191} + \delta Td_{192} + \delta Td_{193} + \delta Td_{194} \qquad (10).$$

Here, coefficients of the variations (i.e. relative errors) in the time durations $Td_{191}$, $Td_{192}$, $Td_{193}$, and $Td_{194}$ are $\alpha_{191}$, $\alpha_{192}$, $\alpha_{193}$, and $\alpha_{194}$, respectively. These coefficients are defined by:

$$\alpha_i = \delta Td_i / Td_i (i=191, 192, 193, 194) \qquad (11),$$

and then the above inequality (10) can be expressed as follows:

$$Tm_{19} > \alpha_{191} \cdot Td_{191} + \alpha_{192} \cdot Td_{192} + \alpha_{193} \cdot Td_{193} + \alpha_{194} \cdot Td_{194} \qquad (12).$$

Namely, in order to prevent an erroneous detection of the overcurrent, the minimum on-time $T_{on(min)19}$ becomes considerably larger than the minimum value of the right hand side of the inequality (6), $(Td_{193} + Td_{194} + Td_{196})$. As a result, the time period during which the overcurrent flows through the main switch 1901 becomes long and a current peak of the current $I_{(t)}$ becomes large, which increases the likelihood that the main switch 1901 may be destroyed.

Additionally, since the on-resistance $R_{on1901}$ has a positive temperature characteristic, when a MOSFET is used for the main switch 1901, the voltage drop $\Delta V_{(t)}$ becomes larger as temperature reaches higher. Consequently, if the reference voltage $\Delta V_{ref}$ is constant independent of temperature, it becomes difficult to detect an overcurrent when temperature is low. This will also increase the chance that the main switch 1901 will be destroyed by the overcurrent.

A switching regulator using a PWM buck type converter has been explained as an example. In general, similar problems exist also in switching regulators that supply a predetermined voltage by controlling the on/off of the main switch on a cyclic basis.

SUMMARY OF THE INVENTION

In view of the above problems, the present invention aims to provide an overcurrent protection device which is used in a switching regulator supplying a predetermined voltage by controlling the on/off of a main switch on a cyclic basis and is capable of further reducing the likelihood that the main switch will be destroyed by an overcurrent.

In order to accomplish the above object, the overcurrent protection device of the present invention comprises a judging unit, a controller, a first prohibiting unit, and a second prohibiting unit. The judging unit is operable to make a judgment whether the overcurrent is flowing through the main switch. The controller is operable to turn off the main switch when the judging unit judges that the overcurrent is flowing through the main switch. The first prohibiting unit is operable to prohibit the controller from turning off the main switch during a first time period following after the control signal being output to instruct the controller to turn on the main switch. The second prohibiting unit is operable to prohibit the controller from turning off the main switch during a second time period following after the main switch being turned on. The second time period starts at or before an end of the first time period, and the first time period ends before an end of the second time period.

Herewith, the first time duration can be set shorter than the time duration $T_{reset19}$ of the above conventional technology. Accordingly, the margin, which has to be included due to variations in individual time constant circuits, can be reduced, and the main switch can be turned off at the early stage when an overcurrent occurs. As a result, the likelihood that the main switch will be destroyed by the overcurrent can be further reduced.

Here, the judging unit may make the judgment by comparing a voltage corresponding to a current flowing through the main switch with a reference voltage. When the main switch is turned on and a current starts flowing, a potential difference between drain and source of the main switch is being increased. Here, the above configuration prevents the controller from turning off the main switch as a result of an erroneous interpretation of the large potential difference as an overcurrent.

Here, the second prohibiting unit may time the second time period by using a time constant circuit which does not include a resistor.

The above configuration allows for reducing the variations in the time constant that are attributed to characteristics of the individual components making up the time constant circuit. Accordingly, the margin that has to be included in the second time duration can be reduced, and thereby the second time duration can be shortened. As a result, the main switch can be turned off at the early stage when an overcurrent occurs, and therefore the likelihood that the main switch will be destroyed by the overcurrent can be further reduced.

Here, the judging unit may include a comparative switch and a constant current source. The comparative switch matches the main switch in terms of electrical characteristics. The constant current source is connected in series with the comparative switch. Here, the judging unit makes the judgment by comparing a voltage drop across the main switch and a voltage drop across the comparative switch.

Alternatively, the judging unit may include a different comparative switch described above along with the constant current source. The comparative switch is integrated on a semiconductor substrate where the main switch is integrated. Here, the constant current source is connected in series with the comparative switch. The judging unit makes the judgment by comparing a voltage drop across the main switch and a voltage drop across the comparative switch.

Herewith, the main switch and the comparative switch, which are formed on the same semiconductor substrate, match one another in terms of electrical characteristics. Accordingly, variations in the on-resistance and temperature characteristics between the main switch and the comparative switch can be reduced, and the overcurrent can be detected with a high degree of accuracy.

Here, the judging unit may include a comparative switch, a constant current source, a detective resistor, and a detective switch. The comparative switch matches the main switch in terms of electrical characteristics. The constant current source is connected in series with the comparative switch. The detective switch is turned on and off concurrently with the main switch, and makes up a series circuit with the detective resistor. The series circuit is connected in parallel with the main switch. Here, the judging unit makes the judgment by comparing a voltage drop across the detective resistor and a voltage drop across the comparative switch.

Alternatively, the judging unit may include a different comparative switch described above along with the constant current source, the detective resistor, and the detective switch. The comparative switch is integrated on a semiconductor substrate where the main switch is integrated. Here, the constant current source is connected in series with the comparative switch. The detective switch is turned on and off concurrently with the main switch, and makes up a series circuit with the detective resistor. The series circuit is connected in parallel with the main switch. The judging unit makes the judgment by comparing a voltage drop across the detective resistor and a voltage drop across the comparative switch.

In this situation, when the value of resistance of the detective resistor is set sufficiently larger than the on-resistance of the detective switch, an occurrence of the overcurrent can be detected more precisely.

Here, the overcurrent protection device may further comprise a detection stopping unit operable to turn off the detective switch during the second time period. Herewith, a change in the voltage drop due to the detective resistor can be reduced, and a stable operation for protecting the main switch from an overcurrent with less crosstalk can be achieved.

An overcurrent protection device of the present invention comprises a rectifier switch, a judging unit, a controller, a first prohibiting unit, and a second prohibiting unit. The rectifier switch is operable to be turned on and off alternately with the main switch. The judging unit is operable to make a judgment whether the overcurrent is flowing through the main switch. The controller is operable to, (i) when the judging unit judges that the overcurrent is flowing through the main switch, turn off the main switch, and (ii) when one of the main switch and the rectifier switch is to be turned on, turn off the other switch beforehand. The first prohibiting unit is operable to prohibit the controller from turning off the main switch during a first time period following after the control signal being output to instruct the controller to turn on the main switch. The second prohibiting unit is operable to prohibit the controller from turning off the main switch during a second time period following after the rectifier switch being turned off.

Herewith, the margin, which has to be included owing to variations in individual time constant circuits, can be reduced, and thereby the likelihood that the main switch will be destroyed by the overcurrent can be reduced.

When either one of the main switch and the rectifier switch is to be turned on, the controller turns off the other switch beforehand. Here, however, the second prohibiting unit prohibits the main switch from being turned off for a predetermined time period following after the rectifier switch is turned off. Accordingly, the above configuration is certain to prevent the main switch from being turned off as a result of an erroneous detection of an overcurrent immediately after the main switch is turned on.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings.

DESCRIPTION OF PREFERRED EMBODIMENTS

The following gives an account of preferred embodiments of an overcurrent protection device according to the present invention with the aid of drawings.

1. First Embodiment

In this embodiment, the overcurrent protection device according to the present invention is described taking a synchronous DC-DC converter (hereinafter, simply "switching regulator") as an example.

1.1 Configuration

Figure 1:
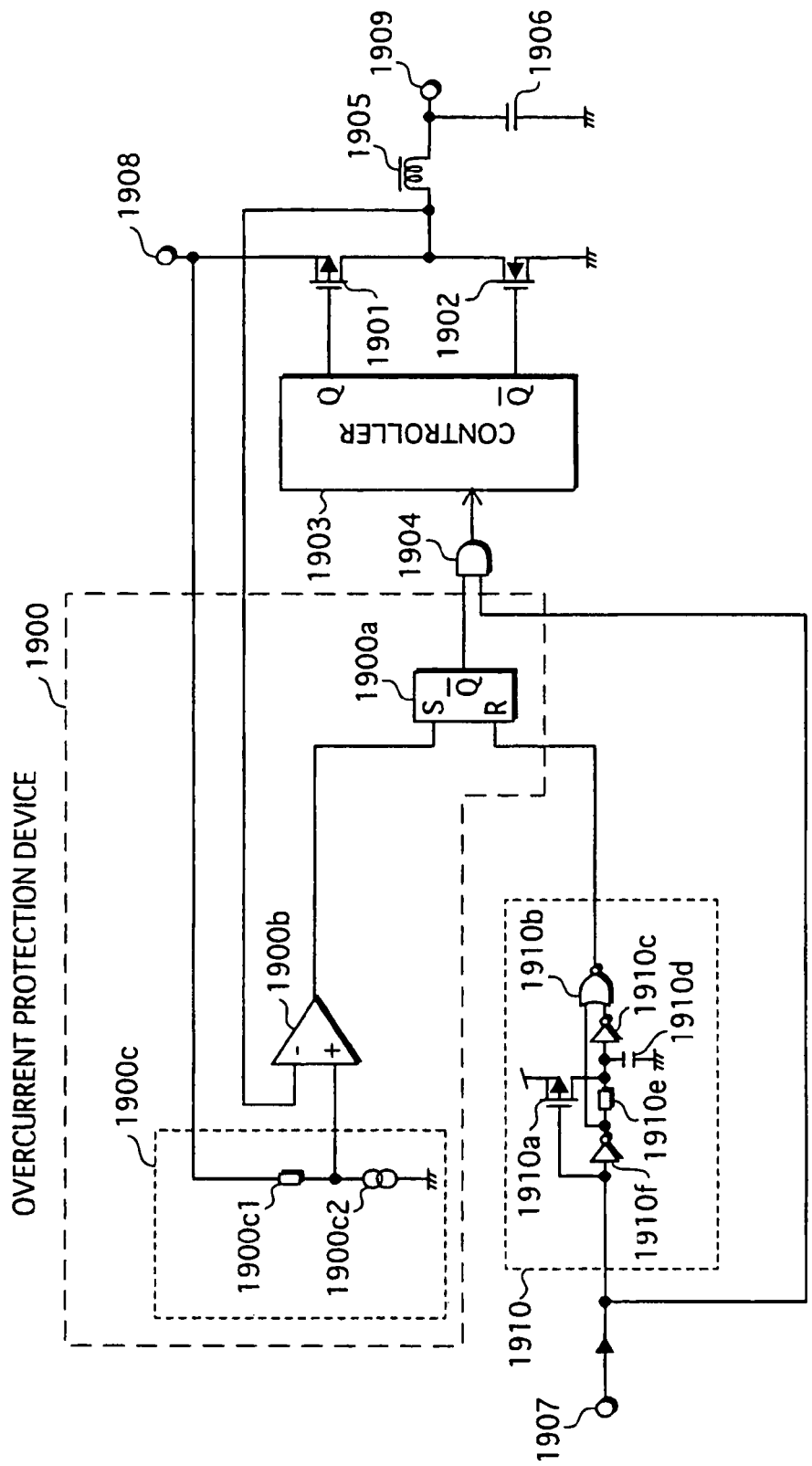
FIG. 1 is a circuit diagram showing a configuration of a switching regulator according to prior art.
Figure 2:
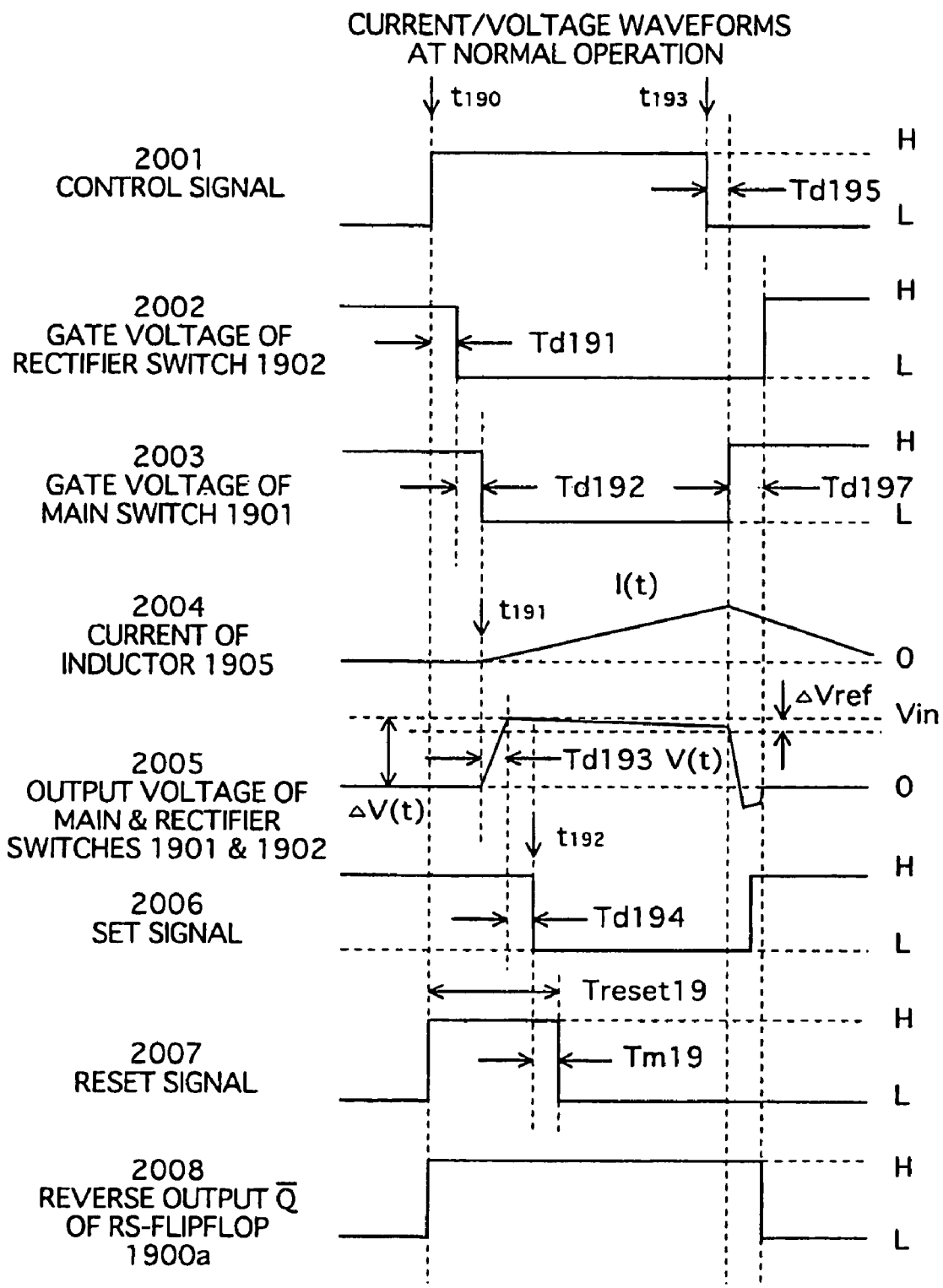
FIG. 2 is a timing chart showing a normal operation of the switching regulator according to the conventional technology.
Figure 3:
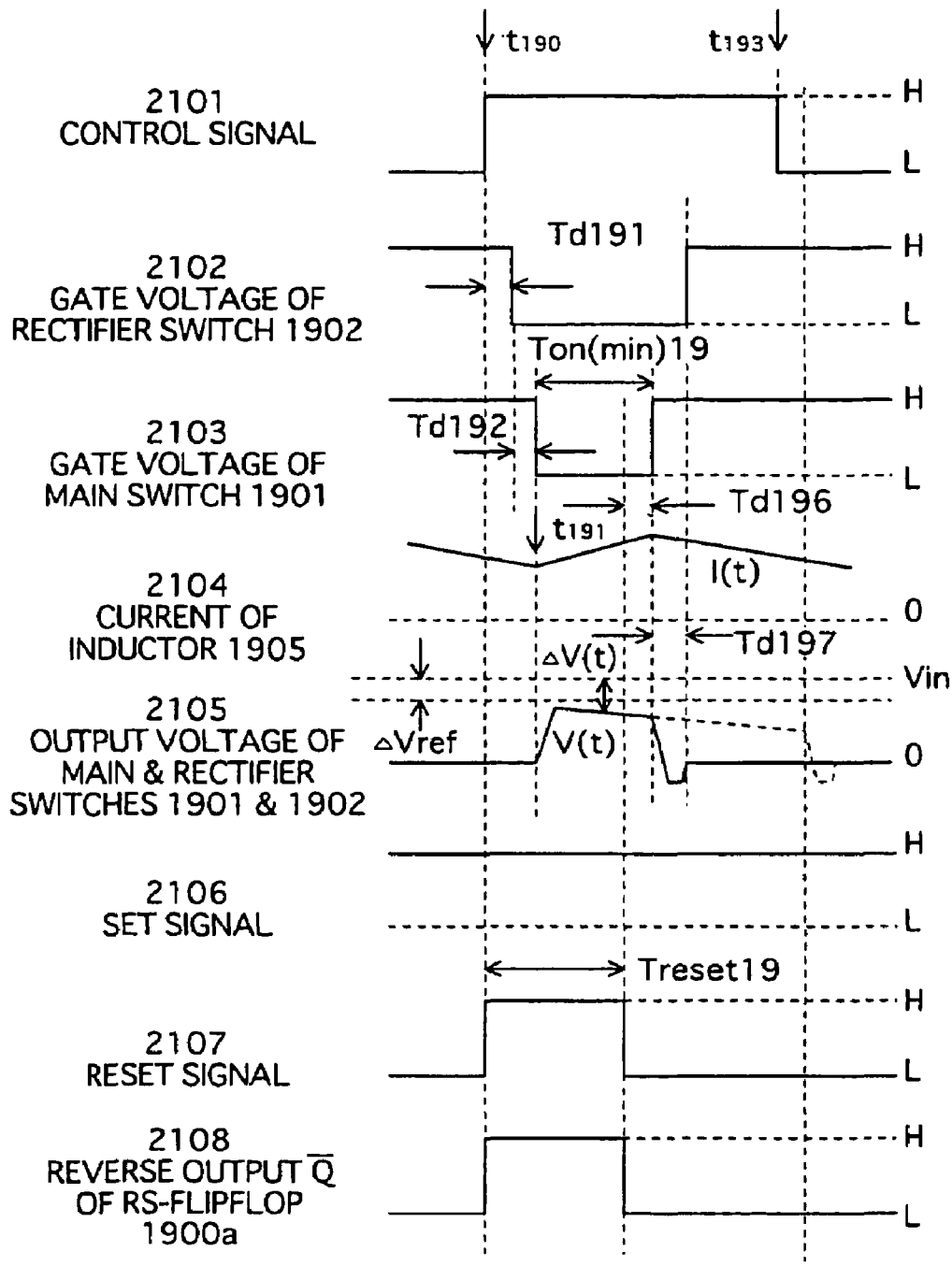
FIG. 3 is a timing chart showing an operation of the switching regulator according to the conventional technology performed at the time when an overcurrent occurs.
Figure 4:
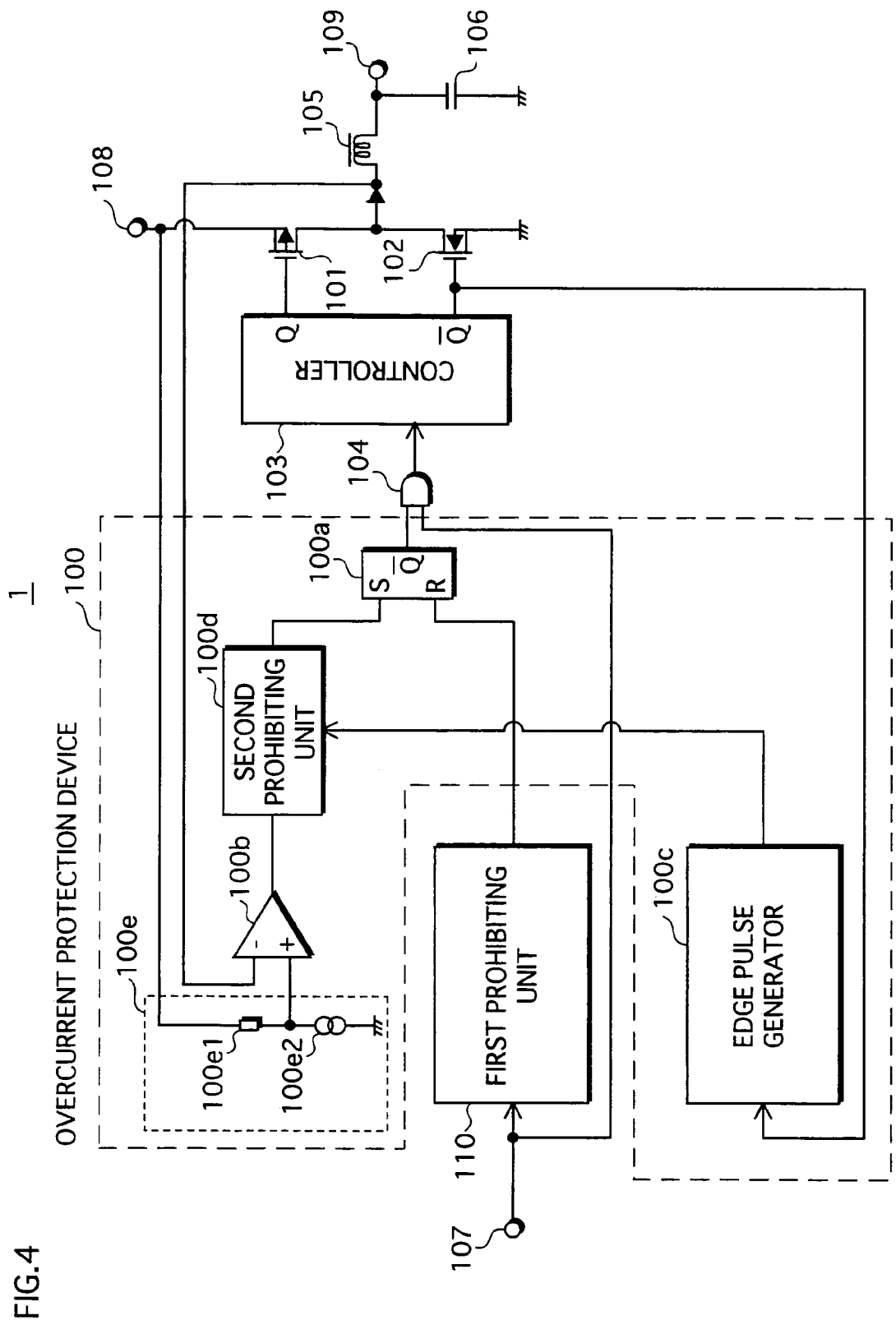
FIG. 4 is a circuit diagram showing a configuration of a switching regulator according to a first embodiment of the present invention.

FIG. 4 is a circuit diagram showing a configuration of a switching regulator according to the first embodiment. As shown in FIG. 4, a switching regulator 1 comprises an overcurrent protection device 100, a main switch 101, a rectifier switch 102, a controller 103, an AND circuit 104, an inductor 105, a capacitor 106, a control terminal 107, an input terminal 108, an output terminal 109, and a first prohibiting unit 110.

The overcurrent protection device 100 includes an RS-flip-flop 100a, a judging unit 100b, an edge pulse generator 100c, a second prohibiting unit 100d, and a reference voltage source 100e. The reference voltage source 100e includes a resistor 100e1 and a constant current source 100e2.

Figure 5:
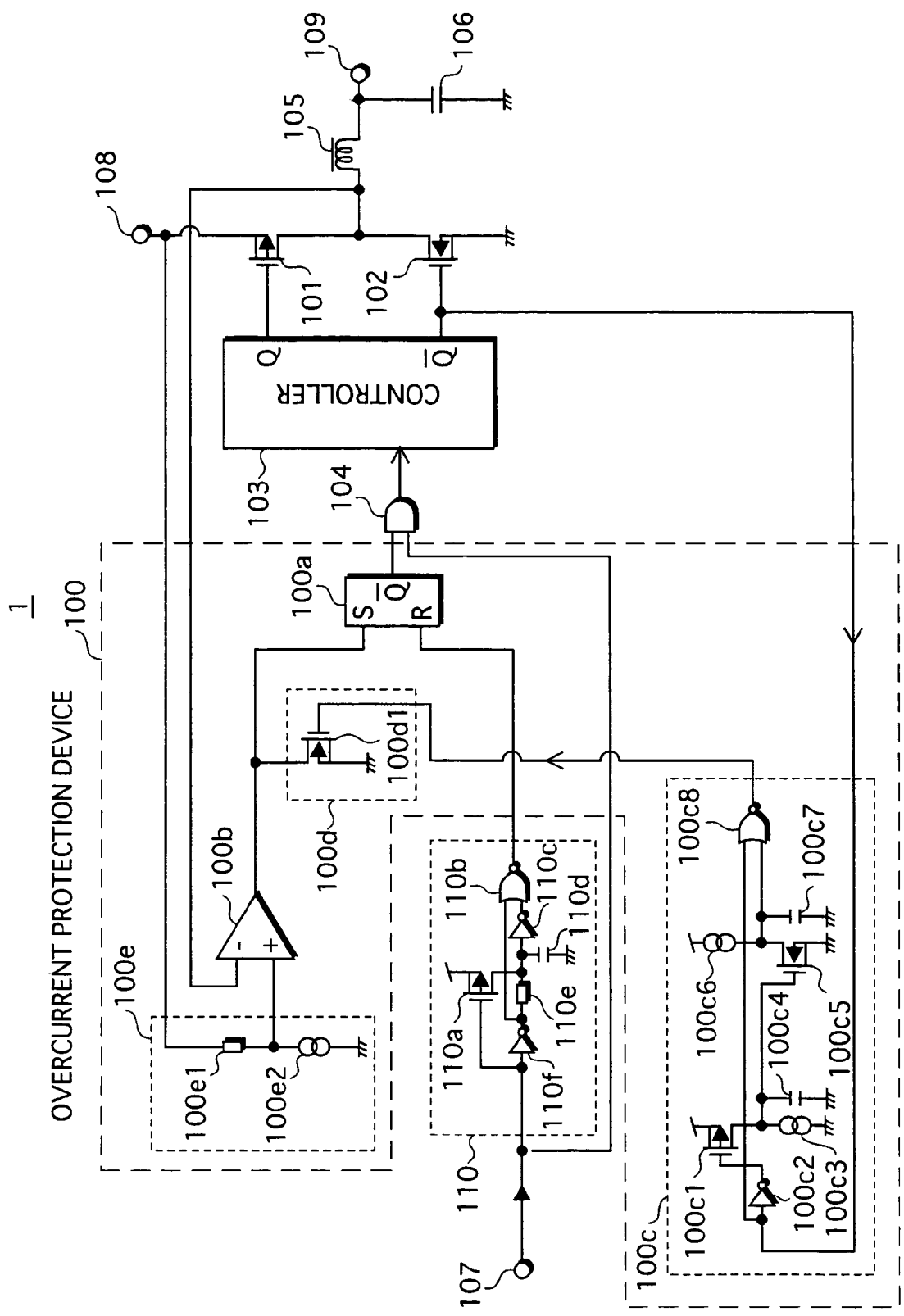
FIG. 5 is a circuit diagram showing a detailed configuration of the switching regulator according to the first embodiment.

As with FIG. 4, FIG. 5 is a circuit diagram also showing the configuration of the switching regulator 1, in particular showing a detailed configuration of the first prohibiting unit 110, the edge pulse generator 100c, and the second prohibiting unit 100d.

As shown in FIG. 5, the first prohibiting unit 110 includes a switch 110a, a NOR circuit 110b, NOT circuits 110c and 110f, a capacitor 110d, and a resistor 110e.

The edge pulse generator 110c includes switches 100c1 and 100c5, a NOT circuit 100c2, a constant current sources 100c3 and 100c6, capacitors 100c4 and 100c7, and a NOR circuit 100c8. Among these, the constant current sources 100c3 and 100c6 and the capacitor 100c4 and 100c7 make up a time constant circuit. The time constant circuit is characterized by not having a resistor. The switches 100c1 is an FET.

The edge pulse generator 100c generates a signal for setting a set signal at L (hereafter, "prohibition signal") from a signal which is input to a gate terminal of the rectifier switch 102, and outputs this prohibition signal to the second prohibiting unit 100d. Pulses of the prohibition signal have their rising edges in synchronization with trailing edges of a gate voltage of the rectifier switch 102. The pulse width $T_{pulse}$ is determined by a time constant of the time constant circuit.

The second prohibiting unit 100d has a switch 100d1 that is an FET. When the prohibition signal is set at H, the switch 100d1 is turned on, and thereby a set terminal of the RS-flipflop 100a is grounded. As a result, the set signal is set at L.

1.2 Operations of Switching Regulator 1

The following describes operations of the switching regulator 1.

1.2.1 Normal Operation

Figure 6:
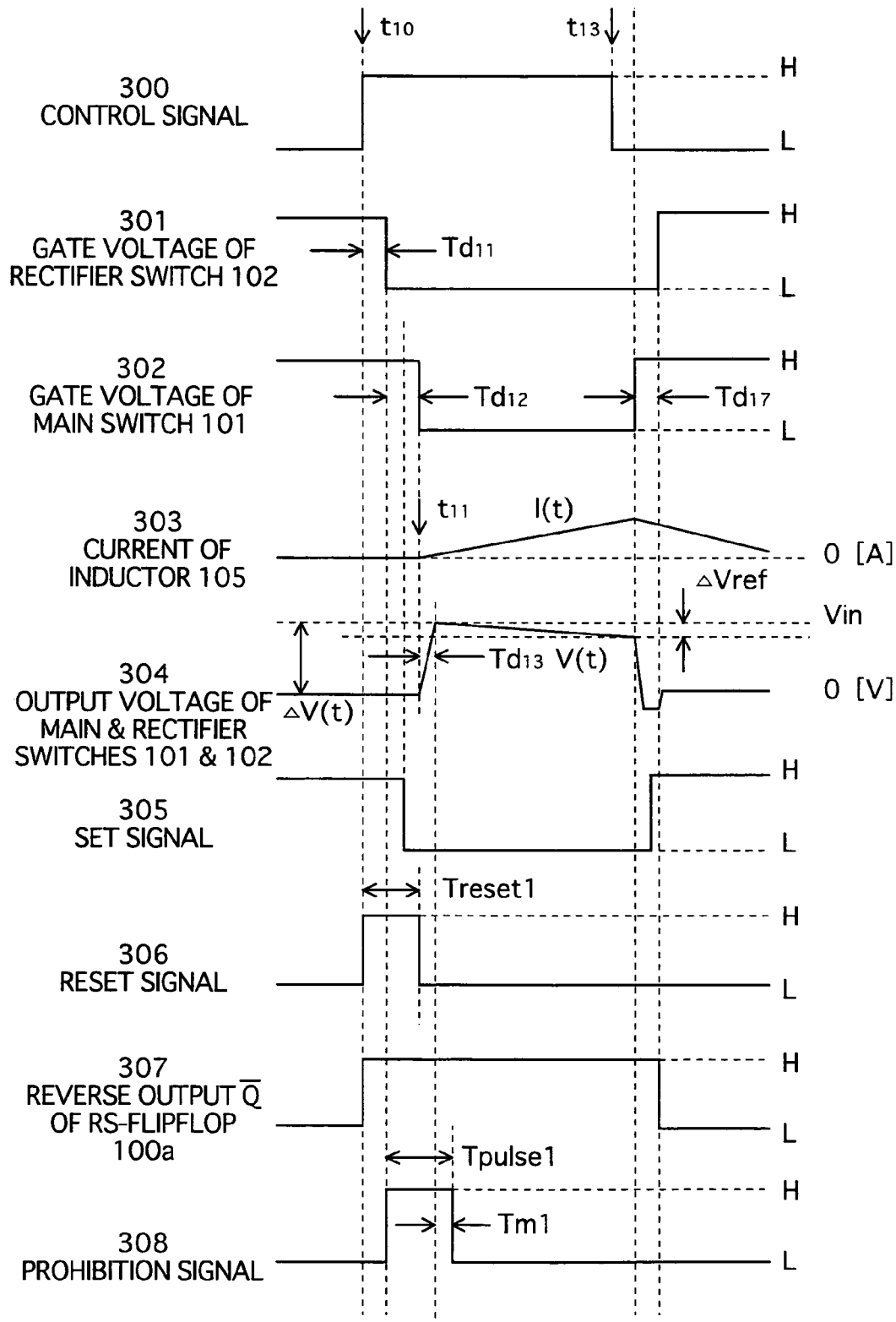
FIG. 6 is a timing chart showing a normal operation of the switching regulator according to the first embodiment.

FIG. 6 is a timing chart showing a normal operation of the switching regulator 1 over one PWM cycle. In FIG. 6, the horizontal axis indicates time, and the vertical axis indicates a voltage or a current. Waveform 300 shows voltage levels of the control signal, Waveform 301 shows gate-voltage levels of the rectifier switch 102, Waveform 302 shows gate-voltage levels of the main switch 101, Waveform 303 shows the amount of the current flowing through the inductor 105, Waveform 304 shows levels of the output voltage provided from a circuit composed of the main switch 101 and the rectifier switch 102, Waveform 305 shows voltage levels of the set signal input to the set terminal of the RS-flipflop 100a, Waveform 306 shows voltage levels of the reset signal input to the reset terminal of the RS-flipflop 100a, Waveform 307 shows voltage levels of the reverse output /Q of the RS-flipflop 100a, and Waveform 308 shows voltage levels of the prohibition signal.

As shown in FIG. 6, the control signal input to the control terminal 107 switches from L to H at the time $t_{10}$ (Waveform 300). In synchronization with this, the reset signal switches from L to H (Waveform 306). Herewith, the reverse output /Q switches from L to H (Waveform 307), and the switching operations of the main switch 101 and the rectifier switch 102 for one cycle start.

After a time duration $Td_{11}$ elapses from a time $t_{10}$, the rectifier switch 102 switches from on to off (Waveform 301). Then, after a time duration $Td_{12}$ elapses, the main switch 101 is turned on at a time $t_{11}$ (Waveform 302). The time durations $Td_{11}$ and $Td_{12}$ are circuit delay times of the controller 103, and especially the time duration $Td_{12}$ is a dead time period for avoiding that both the main switch 101 and the rectifier switch 102 are on at the same time.

Then, a current flows through the main switch 101, and the inductor current $I_{(t)}$ increases (Waveform 303). This inductor current $I_{(t)}$ is supplied to a load circuit (not shown). The amount of the inductor current $I_{(t)}$ is found by Equation (2) shown above. During a time duration $Td_{13}$ after a time $t_{12}$, the output voltage provided from the circuit composed of the main switch 101 and the rectifier switch 102 rises from 0 to $V_{in}$ (Waveform 304).

When the current $I_{(t)}$ flows through the main switch 101, a voltage drop $\Delta V_{(t)}$ between drain and source occurs due to an on-resistance of the main switch 101. The judging unit 100b compares the voltage drop $\Delta V_{(t)}$ with a predetermined reference voltage $\Delta V_{ref}$ for detecting an overcurrent. Between the time $t_{10}$ and a time $(t_{11}+Td_{13})$, because the voltage drop $\Delta V_{(t)}$ is larger than the reference voltage $\Delta V_{ref}$, the judging unit 100b judges that an overcurrent is flowing through the main switch 101, and sets the output voltage at H.

Meanwhile, when the gate voltage of the rectifier switch 102 is set at L at a time $(t_{10}+Td_{11})$ (Waveform 301), the edge pulse generator 100c sets the prohibition signal at H and keeps it during a time duration $T_{pulse1}$ (Waveform 308). After the prohibiting signal is set at H, the second prohibiting unit 100d sets the set signal at L (Waveform 305).

Herewith, the set signal can be set at L considerably earlier than the case in the above conventional technology. As a result, the lower limit of the pulse width $T_{reset1}$ of the reset signal can be lowered in a manner shown in the following inequality:

$$T_{reset1} > Td_{11} + Td_{12} \quad (13).$$

If the time duration $T_{pulse1}$ is too short, the prohibition signal is set at L while the voltage drop $\Delta V_{(t)}$ is still larger than the reference voltage $\Delta V_{ref}$ (i.e. $\Delta V_{(t)} > \Delta V_{ref}$) after the reset signal has switched to L. Consequently, the set signal switches to H while the reverse output /Q switches to L. As a result, the current flowing through the main switch 101 is erroneously interpreted as an overcurrent, and the main switch 101 is turned off inappropriately. In order to prevent this false operation, the time duration $T_{pulse1}$ must satisfy the following inequality:

$$T_{pulse1} > Td_{12} + Td_{13} \quad (14).$$

When the margin of the time duration $T_{pulse1}$ for the right hand side of the inequality (14) is $Tm_1$, the time duration $T_{pulse1}$ is expressed as follows:

$$T_{pulse1} = Td_{12} + Td_{13} + Tm_1 \quad (15).$$

A time period of the margin $Tm_1$ has to be set in a manner that the variations in the circuit delay time of the edge pulse generator 100c are all offset. Namely, the margin $Tm_1$ has to satisfy the following inequality in order that $T_{pulse1}$ satisfies the inequality (14).

$$Tm_1 > \alpha_{12} \cdot Td_{12} + \alpha_{13} \cdot Td_{13} \quad (16),$$

where $\alpha_{12}$ and $\alpha_{13}$ are coefficients of the delay time durations $Td_{12}$ and $Td_{13}$, respectively. When this inequality (16) is compared to the inequality (12) according to the conventional technology, it can be seen that the lower limit of the margin $Tm_1$ has been largely lowered compared to that of the margin $Tm_{19}$.

Shortening the margin $Tm_1$ so that the inequality (16) is satisfied can be attained by reducing the circuit delay time of the edge pulse generator 100c. In this embodiment, the time constant circuit determining the time duration $T_{pulse1}$ is composed of the constant current sources 100c3 and 100c6 and the capacitors 100c4 and 100c7. Herewith, the variations in the time duration $T_{pulse1}$ are reduced to ±30% or less, and the margin $Tm_1$ has been shortened.

The subsequent operation is the same in the case of the conventional technology, as shown in FIG. 6.

1.2.2 Operation At The Time When An Overcurrent Occurs

The following describes an operation of the switching regulator 1 performed at the time when an overcurrent occurs. Depending on the contributing factors, the overcurrent occurs intermittently or continuously. Here, a case in which an overcurrent continuously occurs is described.

Figure 7:
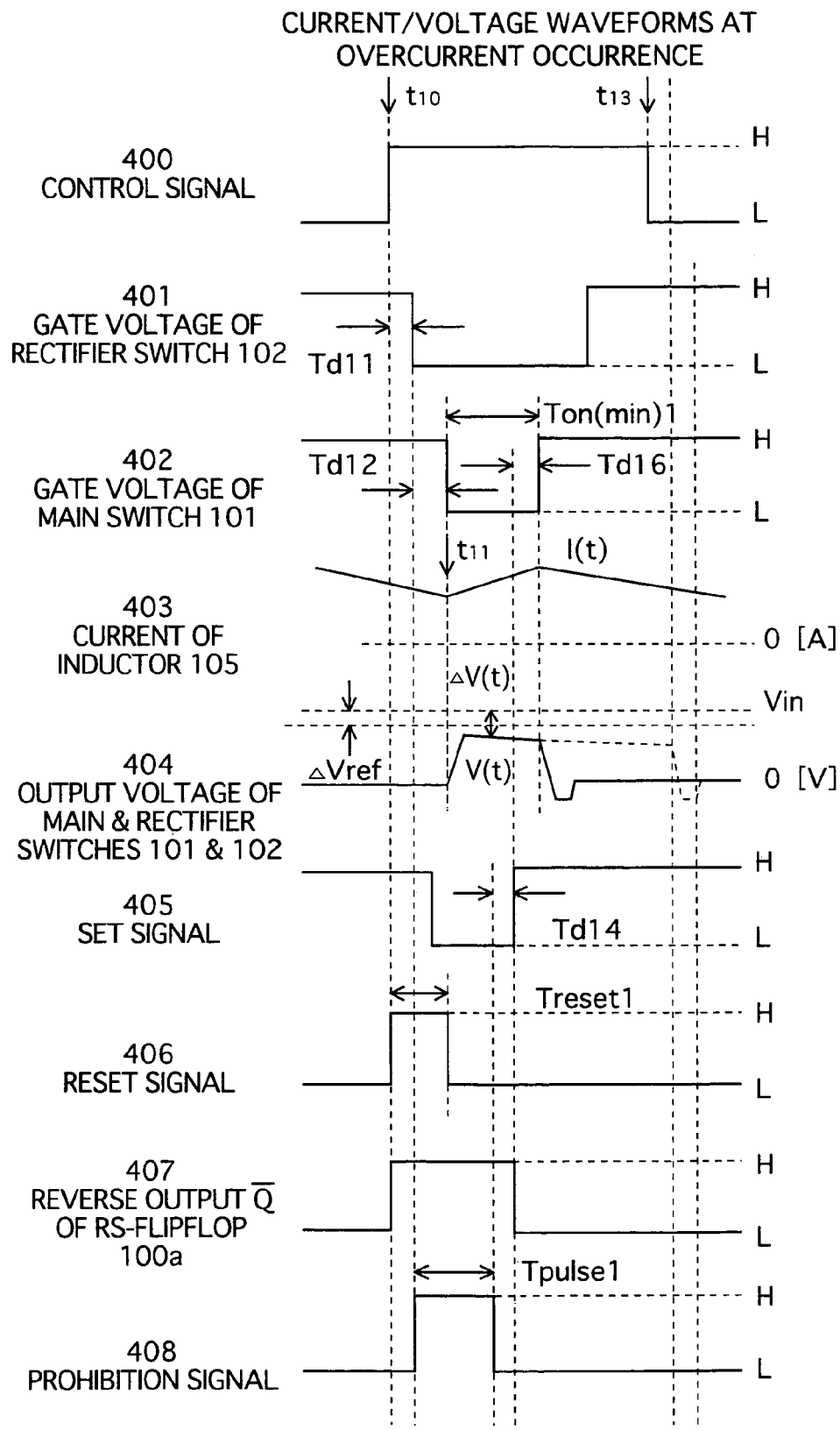
FIG. 7 is a timing chart showing an operation of the switching regulator according to the first embodiment performed at the time when an overcurrent occurs.

FIG. 7 is a timing chart showing an operation of the switching regulator 1 performed at the time when an overcurrent occurs. In FIG. 7, Waveform 400 shows voltage levels of the control signal, Waveform 401 shows gate-voltage levels of the rectifier switch 102, Waveform 402 shows gate-voltage levels of the main switch 101, Waveform 403 shows the amount of the current flowing through the inductor 105, Waveform 404 shows levels of the output voltage provided from the circuit composed of the main switch 101 and the rectifier switch 102, Waveform 405 shows voltage levels of the set signal input to the set terminal of the RS-flipflop 100a, Waveform 406 shows voltage levels of the reset signal input to the set terminal of the RS-flipflop 100a, Waveform 407 shows voltage levels of the reverse output /Q of the RS-flipflop 100a, and Waveform 408 shows voltage levels of the prohibition signal.

After the time duration $T_{pulse1}$ has been elapsed from when the prohibition signal was once set at H, the prohibition signal switches to L (Waveform 408). At this point, if the voltage drop $\Delta V_{(t)}$ is larger than the reference voltage $\Delta V_{ref}$ (i.e. $\Delta V_{(t)} > \Delta V_{ref}$) (Waveform 404), the set signal switches to H (Waveform 405), and the main switch 101 turns off (Waveform 402). Thereby, the overcurrent is cut off. In this situation, a minimum on-time $T_{on(min)1}$ which is a time period during which an overcurrent flows through the main switch 101 can be expressed by the following equation.

$$T_{on(min)1} = T_{pulse1} - Td_{12} + Td_{14} + Td_{16} = Td_{13} + Td_{14} + Td_{16} + Tm_1 \quad (17).$$

In order to shorten the minimum on-time $T_{on(min)1}$, the margin $Tm_1$ has to be set as short as possible. In this embodiment, the variations in the time duration $T_{pulse1}$ are reduced to ±30% or less by using the time constant circuit comprising the constant current sources 100c3 and 100c6 and the capacitors 100c4 and 100c7. Herewith, the margin $Tm_1$ can be shortened, and therefore the minimum on-time $T_{on(min)1}$ can be shortened.

As described above, in the first embodiment, the time duration from when an overcurrent is detected until the main switch 101 is turned off is shortened by reducing the time duration $T_{reset1}$. Herewith, the overcurrent can be cut off at the early stage.

In addition, the time period during which an overcurrent flows through the main switch 101 is shortened by reducing the minimum on-time $T_{on(min)1}$ of the main switch 101. Herewith, the main switch 101 and the rectifier switch 102 are protected from breakdown caused by the overcurrent.

Furthermore, according to the present embodiment, the PWM operations are stopped at the early stage when, for example, a malfunction in the startup of the switches occurs. Accordingly, this prevents the switching regulator from malfunctioning.

2. Second Embodiment

A switching regulator according to the second embodiment has largely the same configuration as the switching regulator according to the first embodiment. The difference between these two is how to control the reset signal that is input to the RS-flipflop. The following mainly explains the difference of the second embodiment from the first embodiment.

Figure 8:
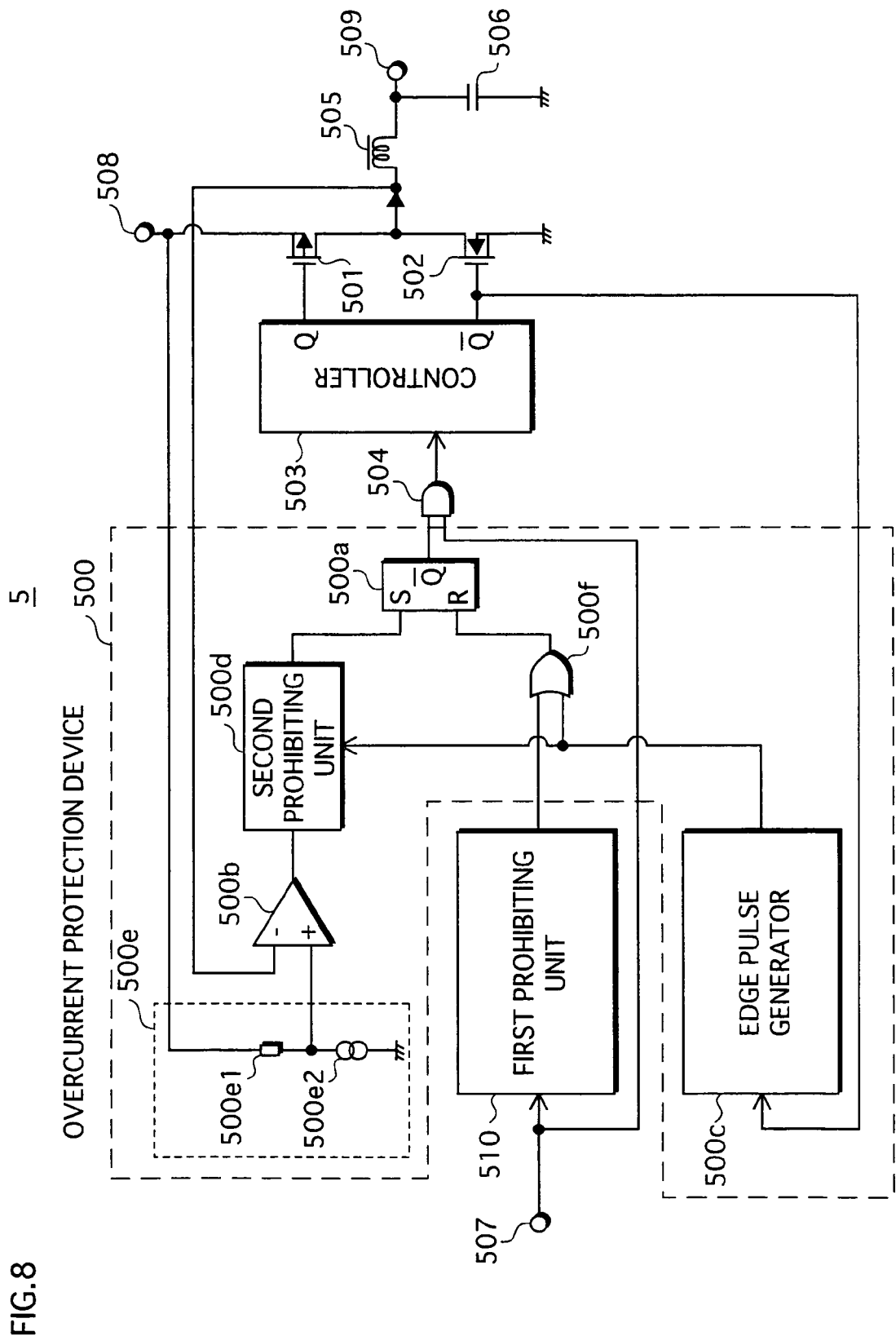
FIG. 8 is a circuit diagram showing a configuration of a switching regulator according to a second embodiment of the present invention.

FIG. 8 is a circuit diagram showing a configuration of a switching regulator according to the second embodiment. As shown in FIG. 8, a switching regulator 5 of the present embodiment comprises an overcurrent protection device 500, a main switch 501, a rectifier switch 502, a controller 503, an AND circuit 504, an inductor 505, a capacitor 506, a control terminal 507, an input terminal 508, an output terminal 509, and a first prohibiting unit 510.

The overcurrent protection device 500 includes an RS-flip-flop 500a, a judging unit 500b, an edge pulse generator 500c, a second prohibiting unit 500d, a reference voltage source 500e, and an OR circuit 500f. The reference voltage source 50e includes a resistor 500e1 and a constant current source 500e2.

In the present embodiment, outputs of the first prohibiting unit 510 and the edge pulse generator 500c are input to the OR circuit 500f, and an output of the OR circuit 500f is input to a reset terminal of the RS-flipflop 500a. That is, a logical sum of an output signal of the first prohibiting unit 510 and the prohibition signal of the edge pulse generator 500c is the reset signal. The rest of the configuration is the same as in the first embodiment.

2.1 Operations of Switching Regulator 5

The switching regulator 5 performs largely the same operations as the switching regulator of the first embodiment. The prohibition signal switches to H in synchronization with the rectifier switch 502 switching to L. Therefore, if the time duration $T_{reset1}$ is set longer than the time duration $Td_{11}$, an erroneous detection of an overcurrent can be prevented. Note here that the time duration $T_{reset1}$ is a time period during which the output signal of the first prohibiting unit 510 is kept at H while the time duration $Td_{11}$ is a time period from when the control signal is set at H until the gate voltage of the rectifier switch 502 is set at L.

$$T_{reset1} > Td_{11} \quad (18).$$

Namely, because the lower limit of $T_{reset1}$ can be lowered, the time period from when an overcurrent is detected until the main switch 501 is turned off can be shortened by reducing the time duration $T_{reset1}$. Herewith, the overcurrent can be cut off at the earlier stage.

3. Third Embodiment

A switching regulator according to the third embodiment has largely the same configuration as the switching regulator according to the first embodiment. The switching regulator of the third embodiment differs from that of the first embodiment in generating the prohibition signal from, instead of the signal input to the gate terminal of the rectifier switch 101, output signals of the main switch and the rectifier switch. The following mainly explains the difference of the third embodiment from the first embodiment.

3.1 Configuration of Switching Regulator

Figure 9:
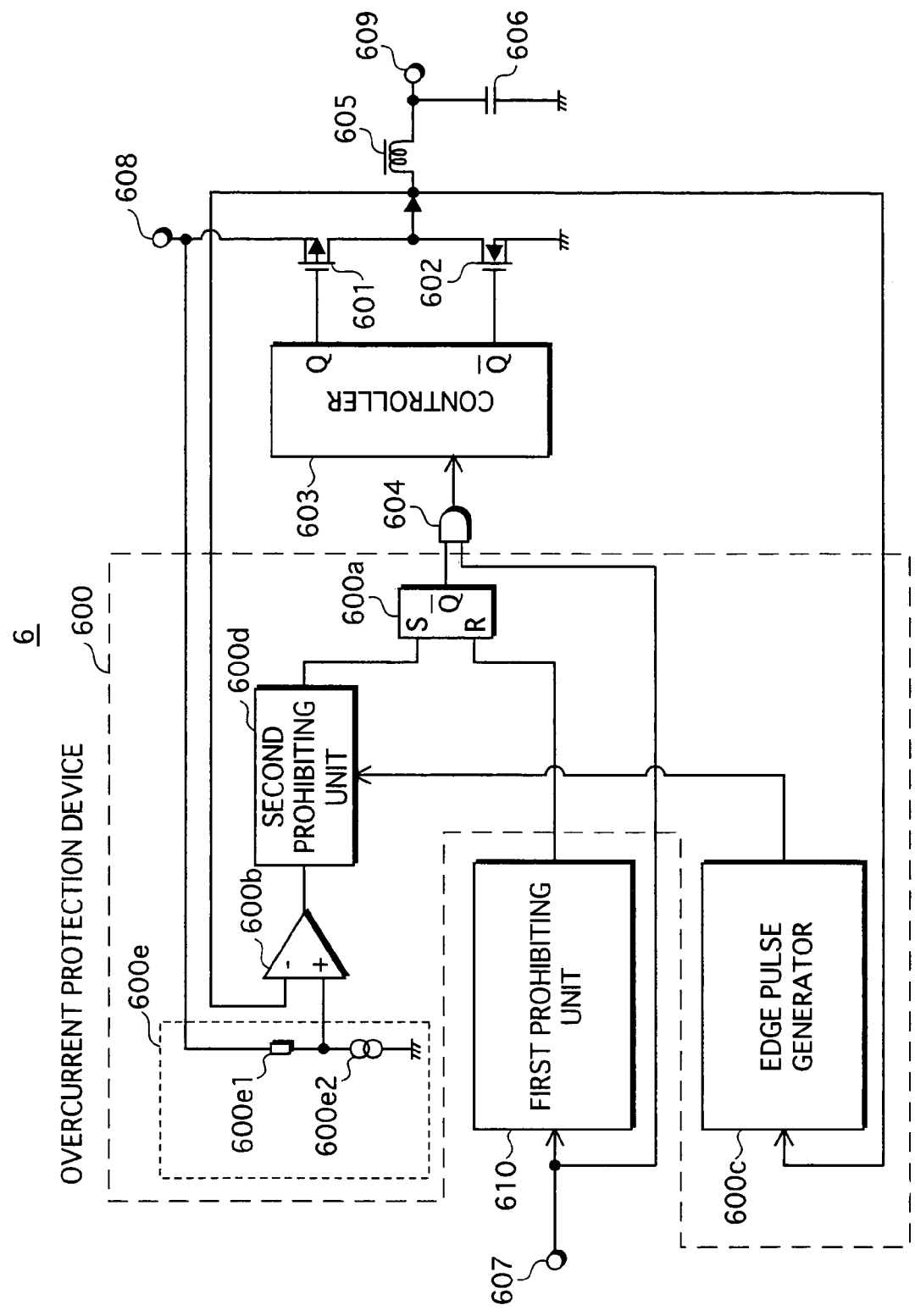
FIG. 9 is a circuit diagram showing a configuration of a switching regulator according to a third embodiment of the present invention.

FIG. 9 is a circuit diagram showing a configuration of a switching regulator 6 according to the third embodiment. As shown in FIG. 9, the switching regulator 6 comprises an overcurrent protection device 600, a main switch 601, a rectifier switch 602, a controller 603, an AND circuit 604, an inductor 605, a capacitor 606, a control terminal 607, an input terminal 608, an output terminal 609, and a first prohibiting unit 610. The first prohibiting unit 610 has the same configuration as the first prohibiting unit 110 of the first embodiment.

The overcurrent protection device 600 includes an RS-flip-flop 600a, a judging unit 600b, an edge pulse generator 600c, a second prohibiting unit 600d, and a reference voltage source 600e. The reference voltage source 600e includes a resistor 600e1 and a constant current source 600e2.

The edge pulse generator 600c is connected to a drain terminal of the rectifier switch 602. When the rectifier switch 602 is turned off, the drain voltage increases. The edge pulse generator 600c outputs the prohibition signal in synchronization with rising edges of the drain voltage.

Figure 10:
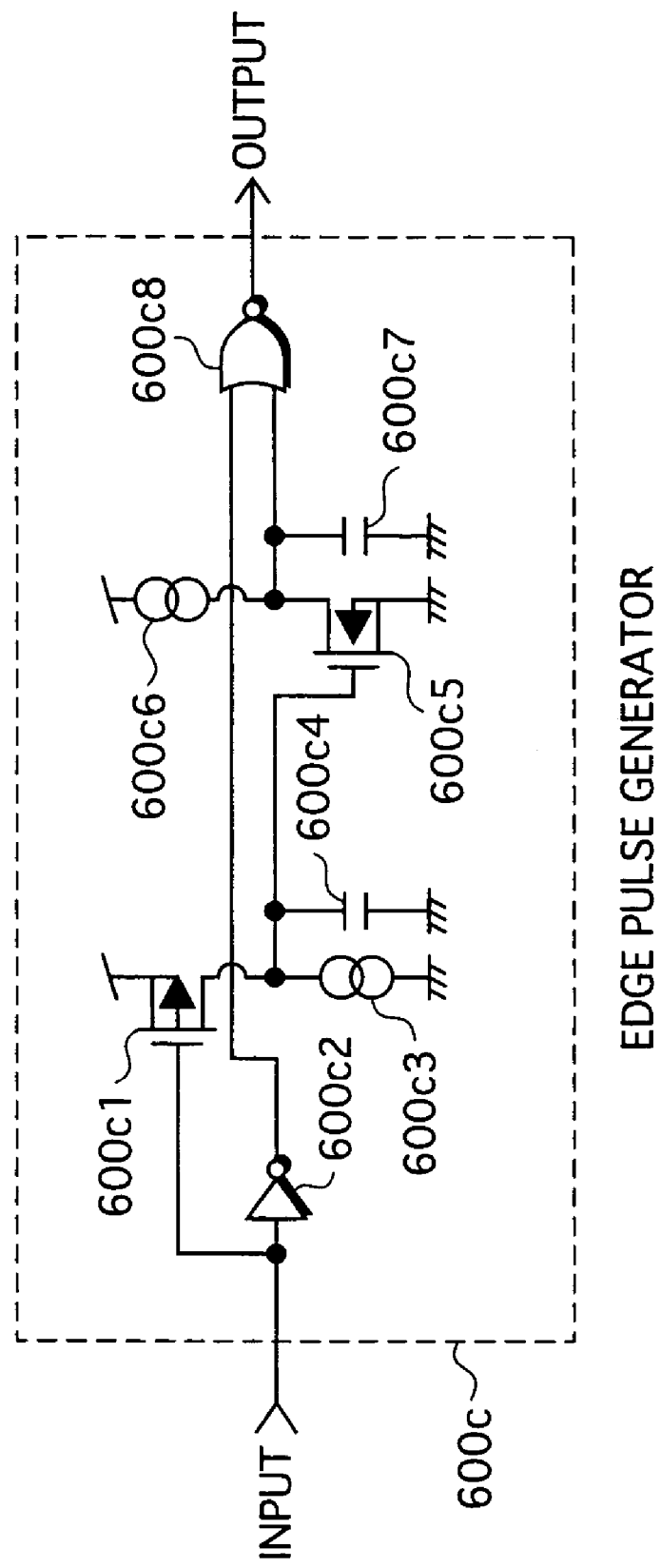
FIG. 10 is a circuit diagram showing a configuration of an edge pulse generator 600c in the switching regulator of the third embodiment.

FIG. 10 is a circuit diagram showing a configuration of the edge pulse generator 600c. As shown in FIG. 10, the edge pulse generator 600c has the same configuration as the edge pulse generator 100c above. Namely, the edge pulse generator 600c includes switches 600c1 and 600c5, a NOT circuit 600c2, constant current sources 600c3 and 600c6, capacitors 600c4 and 600c7, and a NOR circuit 600c8. The constant current sources 600c3 and 600c6 and the capacitors 600c4 and 600c7 make up a time constant circuit. The time constant circuit is characterized by not having a resistor.

In the present embodiment, rising edges of the drain voltage of the rectifier switch 602 are monitored instead of trailing edges of the gate voltage. Consequently, the prohibition signal can be switched to H in more precise synchronization with the rectifier switch being turned off. As a result, both during the normal operation and during the occurrence of an overcurrent, the switching regulator is capable of attaining stable operations.

3.2 Modification of Embodiment

Figure 11:
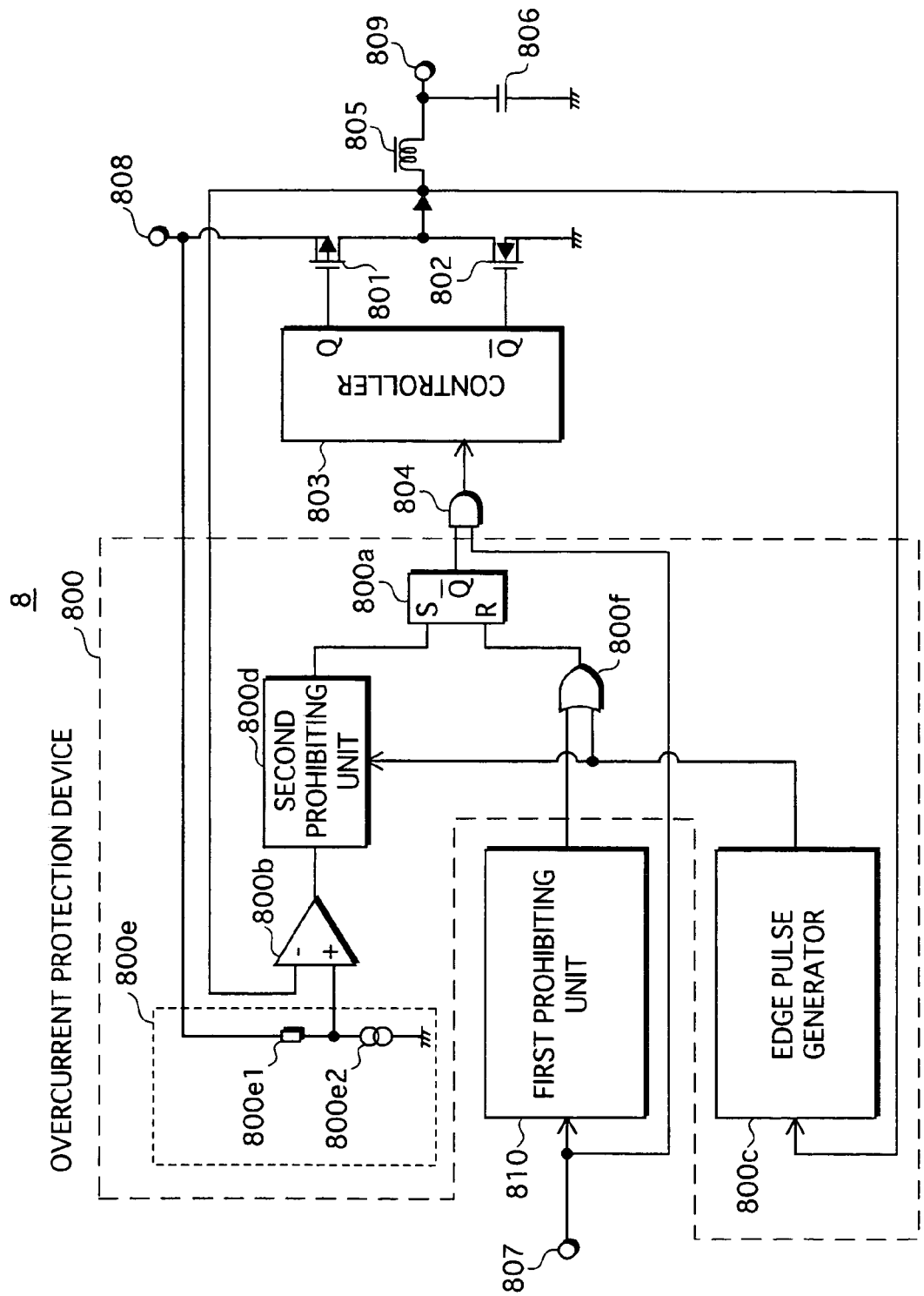
FIG. 11 is a circuit diagram showing a configuration of a switching regulator according to a modification of the third embodiment.

FIG. 11 is a circuit diagram showing a configuration of a switching regulator 8 according to a modification of the present embodiment. As shown in FIG. 11, the switching regulator 8 of this modified embodiment has largely the same configuration as the switching regulator 6 of the above third embodiment. Compared to the third embodiment, the switching regulator 8 of the modified embodiment differs in that outputs of a first prohibiting unit 810 and a second edge pulse generator 800c are input to an OR circuit 800f, and an output of the OR circuit 800f is input to a reset terminal of an RS-flipflop 800a. This difference corresponds to the difference between the first and the second embodiments, and this modified embodiment achieves the same effects as the second embodiment.

4. Fourth Embodiment

A switching regulator of the fourth embodiment has largely the same configuration as the switching regulator according to the first embodiment. Compared to the first embodiment, the switching regulator of the fourth embodiment differs in the configuration of a reference voltage source that is used for detecting an overcurrent. The following explains the present embodiment mostly focusing on this difference.

4.1 Configuration of Switching Regulator

Figure 12:
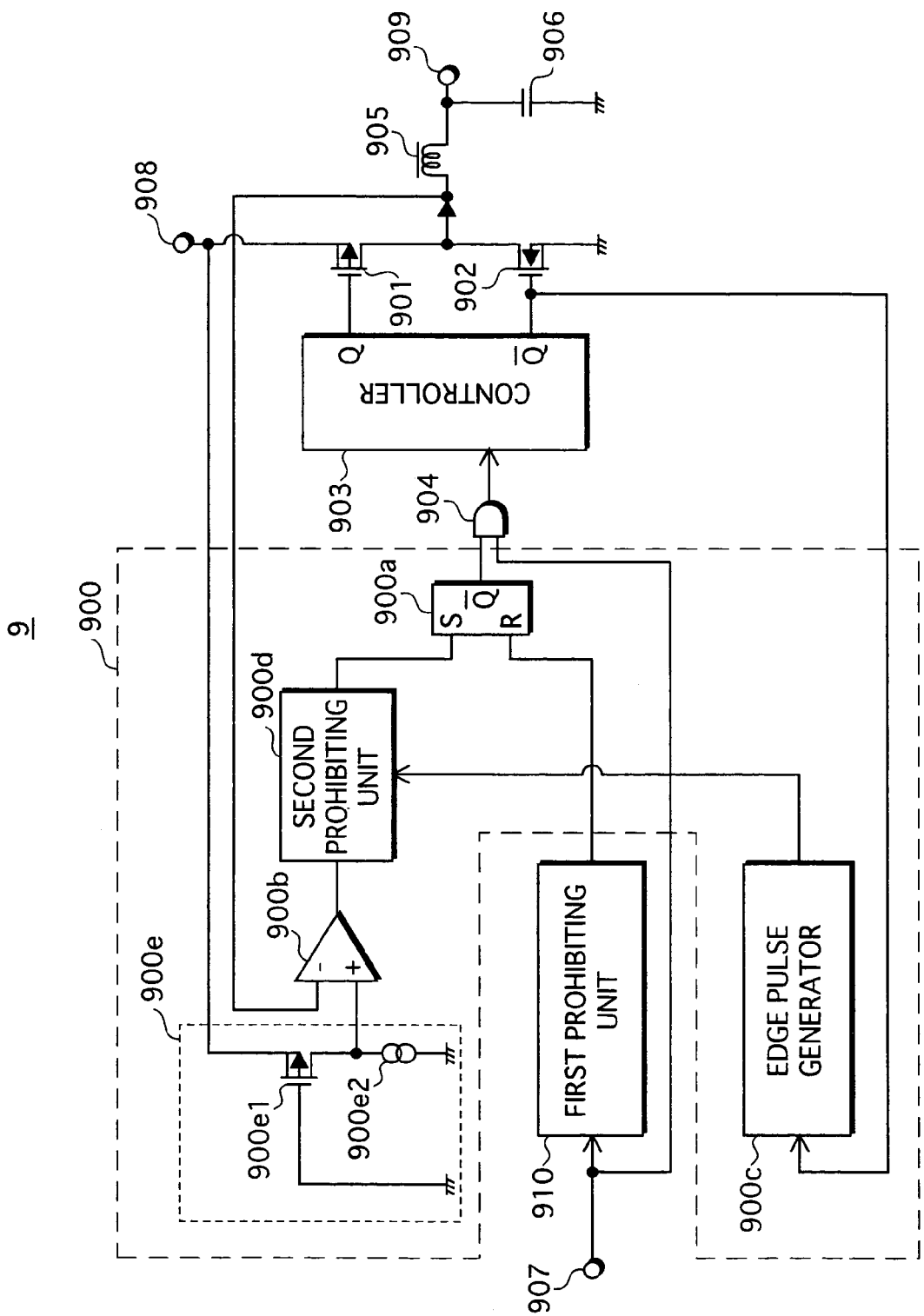
FIG. 12 is a circuit diagram showing a configuration of a switching regulator according to a fourth embodiment.

FIG. 12 is a circuit diagram showing a configuration of a switching regulator 9 according to the fourth embodiment. As shown in FIG. 12, the switching regulator 9 comprises an overcurrent protection device 900, a main switch 901, a rectifier switch 902, a controller 903, an AND circuit 904, an inductor 905, a capacitor 906, a control terminal 907, an input terminal 908, an output terminal 909, and a first prohibiting unit 910.

The overcurrent protection device 900 includes an RS-flip-flop 900a, a judging unit 900b, an edge pulse generator 900c, a second prohibiting unit 900d, and a reference voltage source 900e. The reference voltage source 900e includes a comparative switch 900e1 and a constant current source 900e2. Here, a comparative switch 900e1 is a P-channel MOSFET and the gate is grounded. Namely, the feature of this switching regulator 9 is that the comparative switch 900e1 is connected, instead that the resistor 25 is connected as in the first embodiment.

The reference voltage $\Delta V_{ref}$ for detecting an overcurrent is defined by a voltage drop between drain and source of the comparative switch 900e1. This voltage drop is caused by an on-resistance $R_{on900e1}$ of the comparative switch 900e1 and a current $I_s$ supplied by the constant current source 900e2. Namely, the reference voltage $\Delta V_{ref}$ can be found by the following equation:

$$\Delta V_{ref} = V_{in} - R_{on900e1} \cdot I_s \quad (19).$$

On the other hand, the voltage drop $\Delta V_{(t)}$ between drain and source of the main switch 901 is expressed as:

$$\Delta V_{(t)} = V_{in} - R_{on900e1} \cdot I_{(t)} \tag{20}$$

As with the main switch 901, the comparative switch 900e1 is a P-channel MOSFET. Therefore, the on-resistance of the comparative switch 900e1 has similar variations and characteristics of the temperature fluctuation as the on-resistance of the main switch 901. Herewith, whether an overcurrent is flowing through the main switch 901 can be judged with a higher degree of accuracy.

Accordingly, there is no need to set the margin of $\Delta V_{ref}$ larger in order to offset the variations and the temperature fluctuation of the on-resistance of the main switch 901. This results in reducing overcurrent-caused stress placed on the main switch and the peripheral components.

5. Fifth Embodiment

A switching regulator of the fifth embodiment has largely the same configuration as the switching regulator according to the fourth embodiment. Compared to the fourth embodiment, the switching regulator of the fifth embodiment differs in the configuration for detecting an overcurrent. The following chiefly explains this difference.

5.1 Configuration of Switching Regulator

Figure 13:
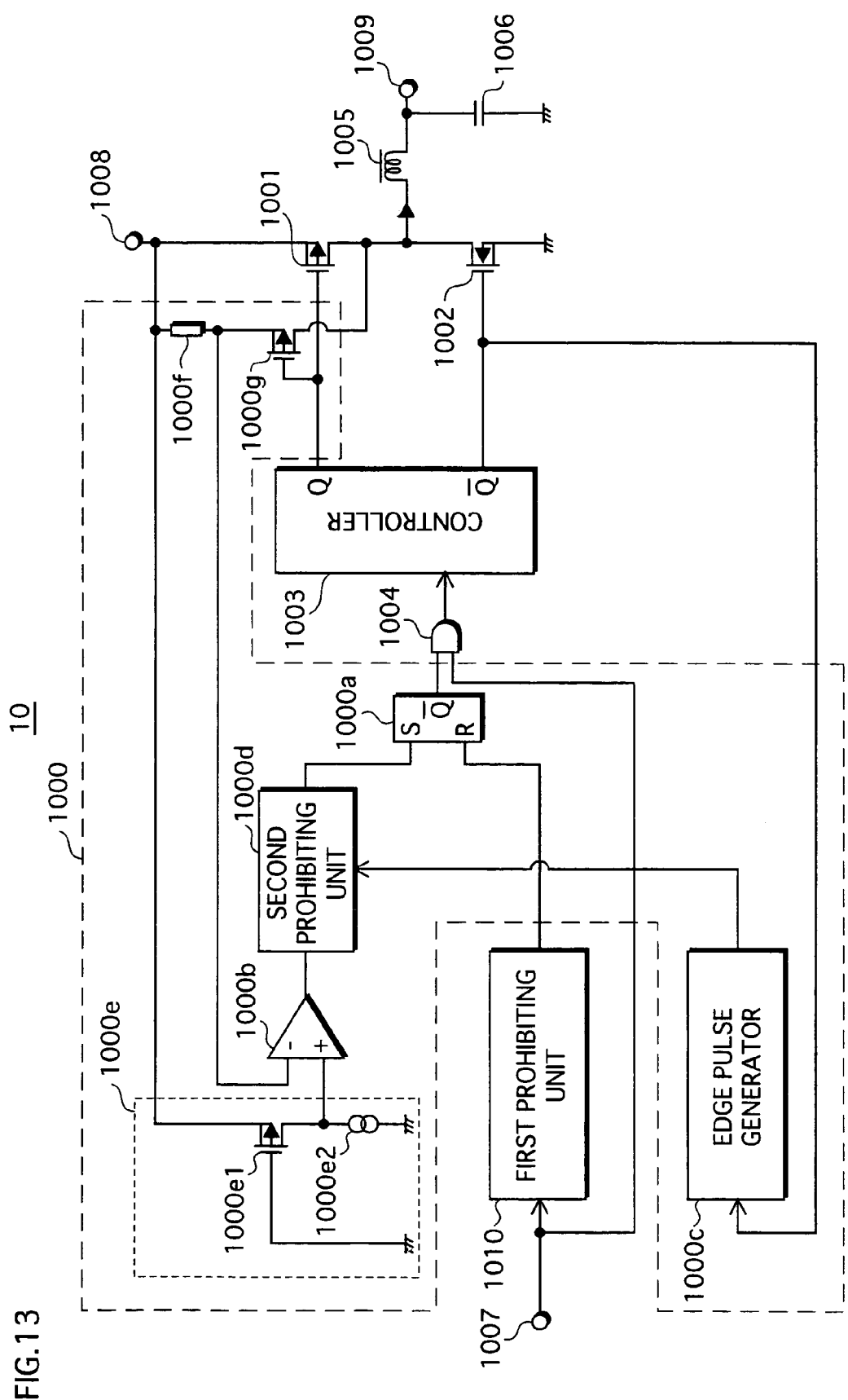
FIG. 13 is a circuit diagram showing a configuration of a switching regulator according to a fifth embodiment.

FIG. 13 is a circuit diagram showing a configuration of a switching regulator 10 according to the fifth embodiment. As shown in FIG. 13, the switching regulator 10 comprises an overcurrent protection device 1000, a main switch 1001, a rectifier switch 1002, a controller 1003, an AND circuit 1004, an inductor 1005, a capacitor 1006, a control terminal 1007, an input terminal 1008, an output terminal 1009, and a first prohibiting unit 1010.

The overcurrent protection device 1000 includes an RS-flipflop 1000a, a judging unit 1000b, an edge pulse generator 1000c, a second prohibiting unit 1000d, a reference voltage source 1000e, a resistor 1000f, and a detective switch 1000g. The reference voltage source 1000e includes a comparative switch 1000e1 and a constant current source 1000e2. The main switch 1001 and the detective switch 1000g are connected in parallel. On the input terminal side of the detective switch 1000g, the resistor 1000f is connected in series with the detective switch 1000g. The same signal from the controller 1003 is input to gate terminals of both the main switch 1001 and the detective switch 1000g, and the detective switch 1000g is turned on and off in synchronization with the main switch 1001.

In all the embodiments described above, the voltage drop $\Delta V_{(t)}$ between drain and gate of the main switch 1001 is monitored in order to detect an overcurrent. However, in the present embodiment, an overcurrent is detected by monitoring an input-output voltage differential $\Delta V_{R1000f}$ of the resistor 1000f according to the above configuration. The input-output voltage differential $\Delta V_{R100f}$ can be found by:

$$\Delta V_{R1000f} = \Delta V_{(t)} \cdot R_{1000f} / (R_{1000f} + R_{on1000g}) \tag{21}$$

where $R_{on1000g}$ is an on-resistance of the detective switch 1000g, $R_{1000f}$ is a value of resistance of the resistor 1000f. By setting the value of resistance $R_{1000f}$ sufficiently larger than the on-resistance $R_{on1000g}$ (for example, around 5 to 100 times), $\Delta V_{R1000f}$ approximates $\Delta V_{(t)}$.

5.2 Operations of Switching Regulator 10

The following describes operations of the switching regulator 10.

5.2.1 Normal Operation

Figure 14:
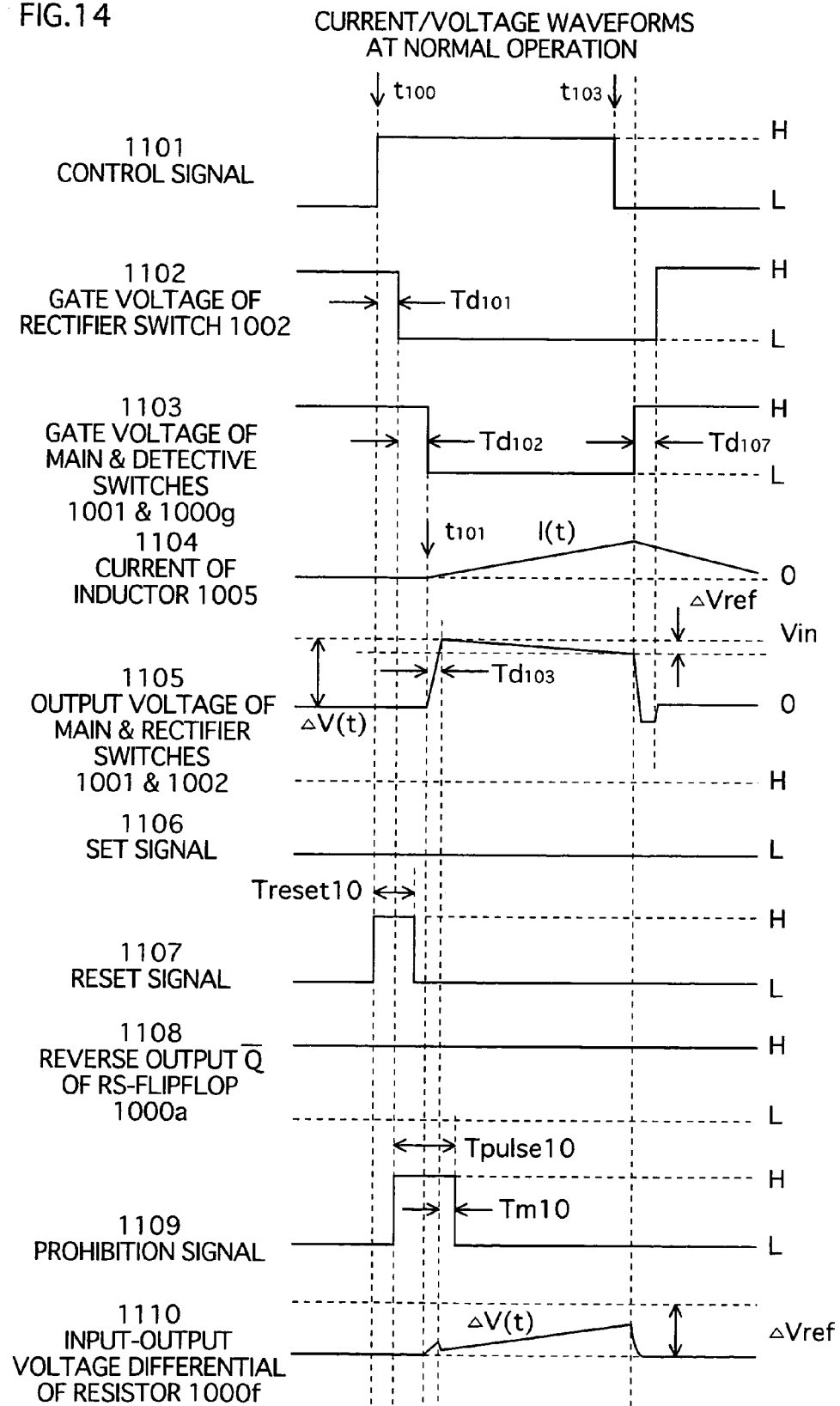
FIG. 14 is a timing chart showing a normal operation of the switching regulator according to the fifth embodiment.

FIG. 14 is a timing chart showing a normal operation of the switching regulator 10 of the fifth embodiment. In FIG. 14, the horizontal axis indicates time, and the vertical axis indicates a voltage or a current. Waveform 1101 shows voltage levels of the control signal, Waveform 1102 shows gate-voltage levels of the rectifier switch 1002, Waveform 1103 shows gate-voltage levels of the main switch 1001 and the detective switch 1000g, Waveform 1104 shows the amount of the current flowing through the inductor 1005, Waveform 1105 shows levels of the output voltage provided from a circuit composed of the main switch 1001 and the rectifier switch 1002, Waveform 1106 shows voltage levels of the set signal, Waveform 1107 shows voltage levels of the reset signal, Waveform 1108 shows voltage levels of the reverse output /Q, Waveform 1109 shows voltage levels of the prohibition signal, and Waveform 1110 shows voltage levels of the input-output voltage differential $\Delta V_{R1000f}$.

As shown in FIG. 14, at a time $t_{100}$, the gate voltage of both the main switch 1001 and the detective switch 1000g is at H (Waveform 1103). Since the detective switch 1000g is off, the output voltage provided from the circuit composed of the main switch 1001 and the rectifier switch 1002 as well as the input-output voltage differential $\Delta V_{R100f}$ of the resistor 1000f are both 0 V (Waveforms 1105 and 1110). Accordingly, because the input-output voltage differential $\Delta V_{R1000f}$ is no larger than the reference voltage $\Delta V_{ref}$ (i.e. $\Delta V_{R1000f} \leq \Delta V_{ref}$) the judging unit 1000b judges that an overcurrent is not flowing through the main switch 1001, and the set signal is set to L (Waveform 1106).

Between times $t_{101}$ and $t_{103}$, because the main switch 1001 and the detective switch 1000g are on, the input-output voltage differential $\Delta V_{R1000f}$ becomes approximately equal to the voltage drop $\Delta V_{(t)}$ between the output voltage provided from the circuit composed of the main and the rectifier switches 1001 and 1002 and the supply voltage (Waveform 1110). If an overcurrent does not occur, the input-output voltage differential $\Delta V_{R1000f}$ is always smaller than the reference voltage $\Delta V_{ref}$ (i.e. $\Delta V_{R1000f} < V_{ref}$), and therefore the set signal is kept at L (Waveform 1106). Subsequently, the gate voltage of the main switch 1001 as well as that of the rectifier switch 1002 are respectively set at H (Waveforms 1102 and 1103), and when the main switch 1001 and the detective switch 1000g are turned off, the input-output voltage differential $\Delta V_{R1000f}$ becomes 0 V (Waveform 1110).

Thus, because the set signal is kept at L, the current flowing through the main switch 1001 would not be erroneously interpreted as an overcurrent.

5.2.2 Operation At The Time When An Overcurrent Occurs

Figure 15:
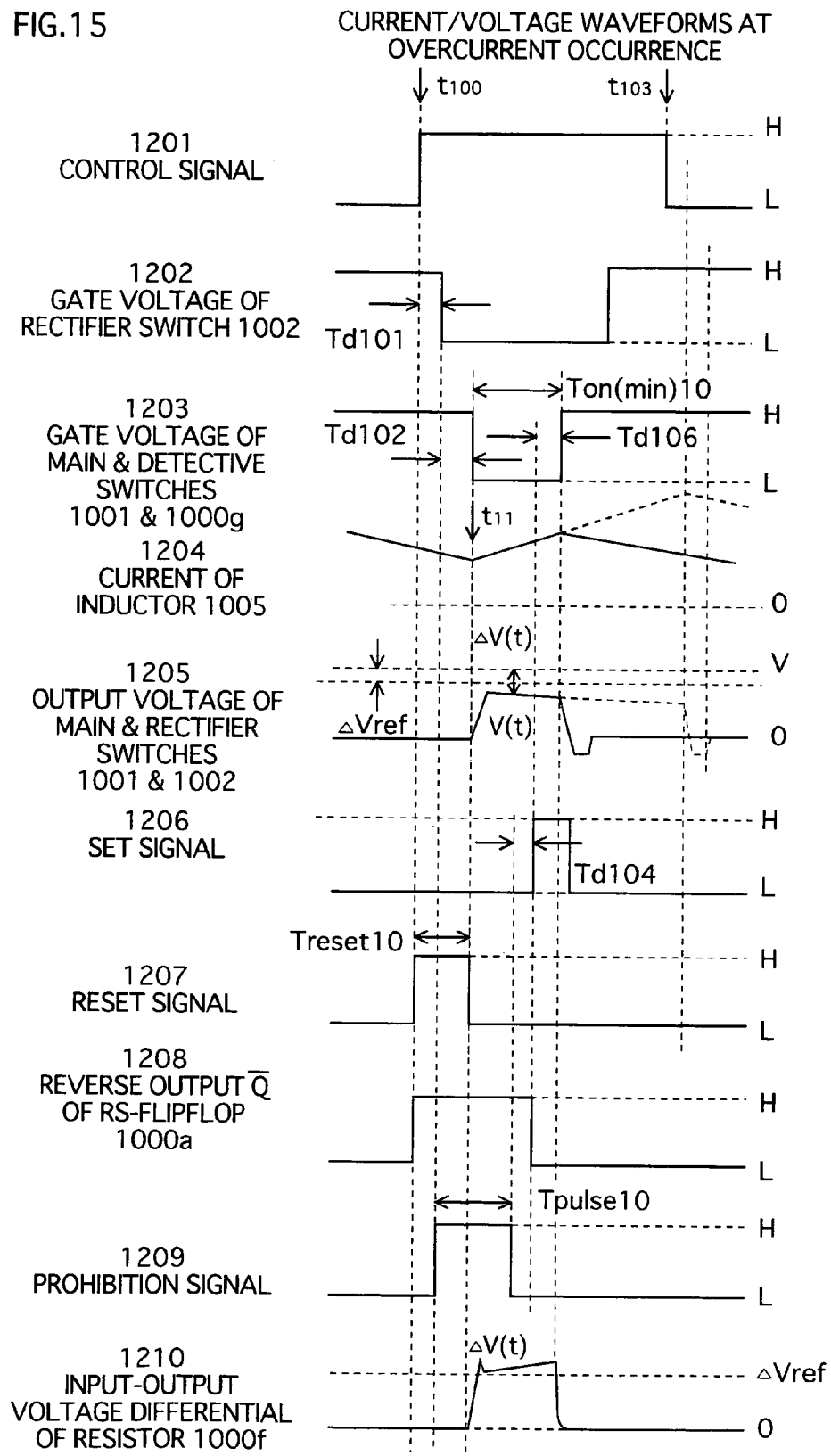
FIG. 15 is a timing chart showing an operation of the switching regulator according to the fifth embodiment performed at the time when an overcurrent occurs.

FIG. 15 is a timing chart showing an operation of the switching regulator 10 performed at the time when an overcurrent occurs. In FIG. 15, the horizontal axis indicates time, and the vertical axis indicates a voltage or a current. Waveform 1201 shows voltage levels of the control signal, Waveform 1202 shows gate-voltage levels of the rectifier switch 1002, Waveform 1203 shows gate-voltage levels of the main switch 1001 and the detective switch 1000g, Waveform 1204 shows the amount of the current flowing through the inductor 1005, Waveform 1205 shows levels of the output voltage provided from the circuit composed of the main switch 1001 and the rectifier switch 1002, Waveform 1206 shows voltage levels of the set signal, Waveform 1207 shows voltage levels of the reset signal, Waveform 1208 shows voltage levels of the reverse output /Q, Waveform 1209 shows voltage levels of the prohibition signal, and Waveform 1210 shows voltage levels of the input-output voltage differential $\Delta V_{R1000f}$.

As shown in FIG. 15, when the gate voltage of the main switch 1001 and the detective switch 1000g switches to L (Waveform 1203) and these switches turn on, the input-output voltage differential $\Delta V_{R1000f}$ increases (Waveform 1210).

After a time duration $T_{pulse10}$ elapses from when the prohibition signal has switched to H, the prohibition signal switches to L (Waveform 1209). At this point, because the input-output voltage differential $\Delta V_{R1000f}$ has become larger than the reference voltage $\Delta V_{ref}$ due to an overcurrent, the judging unit 1000b sets the set signal at H. Herewith, the reverse output /Q of the RS-flipflop 1000a switches to L (Waveform 1208), and the main switch 1001 and the detective switch 1000g are turned off. As a result, the input-output voltage differential $\Delta V_{R1000f}$ becomes 0 V (Waveform 1210).

According to the present embodiment, when the main switch 1001 is off, the input-output voltage differential $\Delta V_{R1000f}$ becomes 0 V. This prevents an erroneous detection of an overcurrent.

Additionally, in the present embodiment, a switching signal having a high through rate and a high amplitude, which occurs when the main switch 1001 is turned on and off, is not input to the judging unit 1000b. Herewith, a more stable operation for protecting the main switch from an overcurrent with less crosstalk can be achieved.

6. Sixth Embodiment

A switching regulator of the sixth embodiment has largely the same configuration as the switching regulator according to the fifth embodiment. Compared to the fifth embodiment, the switching regulator of the sixth embodiment differs in a timing control for applying a current to a resistor used for detecting an overcurrent.

6.1 Configuration of Switching Regulator

Figure 16:
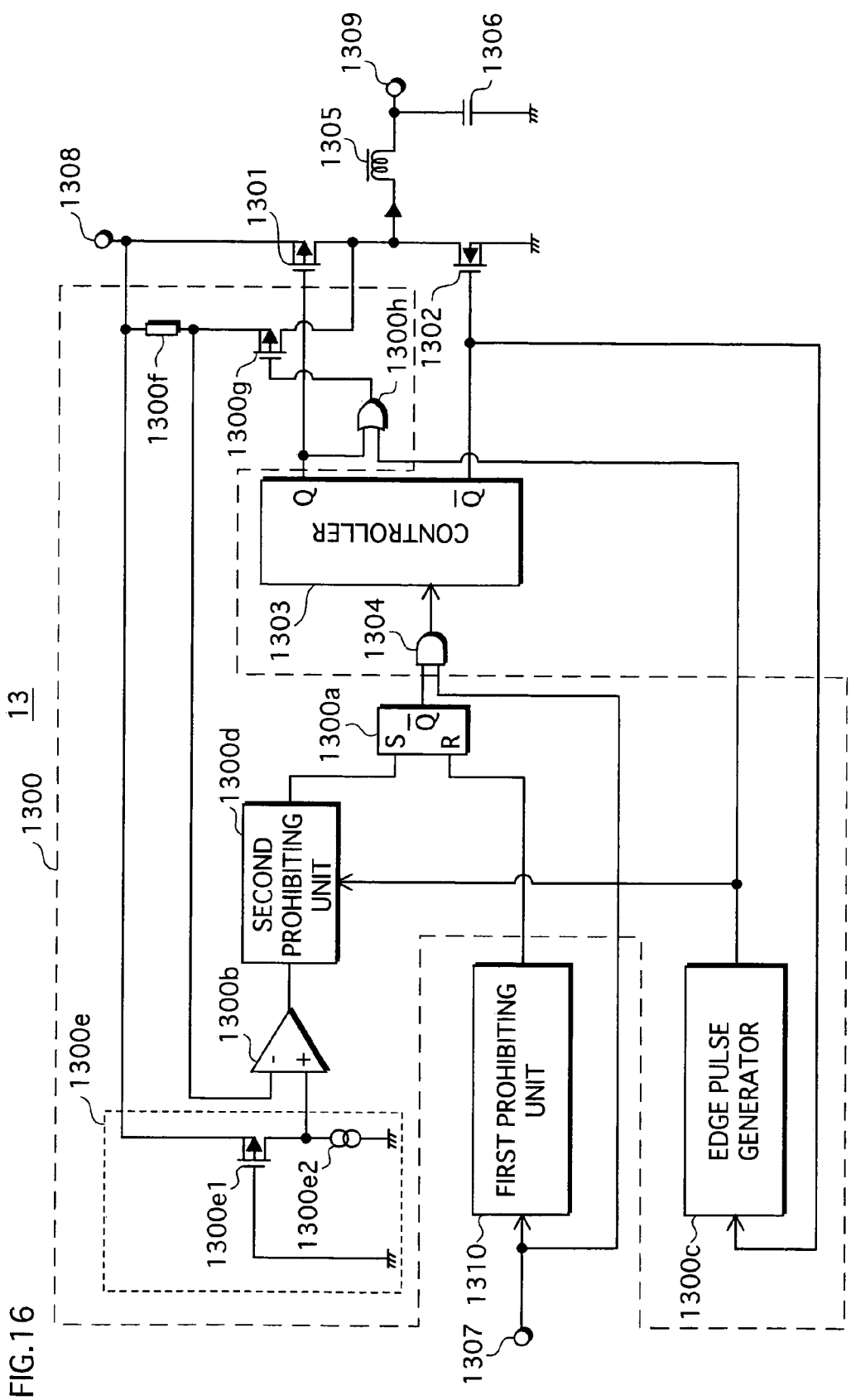
FIG. 16 is a circuit diagram showing a configuration of a switching regulator according to a sixth embodiment.

FIG. 16 is a circuit diagram showing a configuration of a switching regulator 13 according to the sixth embodiment. As shown in FIG. 16, the switching regulator 13 comprises an overcurrent protection device 1300, a main switch 1301, a rectifier switch 1302, a controller 1303, an AND circuit 1304, an inductor 1305, a capacitor 1306, a control terminal 1307, an input terminal 1308, an output terminal 1309, and a first prohibiting unit 1310.

The overcurrent protection device 1300 includes an RS-flipflop 1300a, a judging unit 1300b, an edge pulse generator 1300c, a second prohibiting unit 1300d, a reference voltage source 1300e, a resistor 1300f, a detective switch 1300g, and a detection stopping unit 1300h. The reference voltage source 1300e includes a comparative switch 1300e1 and a constant current source 1300e2. The detection stopping unit 1300h is an OR circuit.

A prohibition signal output by the edge pulse generator 1300c is input to the second prohibiting unit 1300d as well as to the detection stopping unit 1300h. A signal for controlling the main switch 1301 has been input to the detection stopping unit 1300h from the controller 1303, and a logical sum of this signal and the prohibition signal is input to a gate terminal of the detective switch 1300g.

According to this configuration, the detective switch 1300g can be kept off while the output voltage provided from the main switch 1301 and the rectifier switch 1302 increases from the ground potential to the supply potential after the main switch 1301 is turned on. When the detective switch 1300g is off, the input-output voltage differential $\Delta V_{R1300f}$ of the resistor 1300f becomes 0 V. Accordingly, this prevents an erroneous detection of an overcurrent while the output voltage provided from the main switch 1301 and the rectifier switch 1302 is increasing from the ground potential to the supply potential after the main switch 1301 is turned on.

6.2 Operations of Switching Regulator 13

The following describes operations of the switching regulator 13.

6.2.1 Normal Operation

Figure 17:
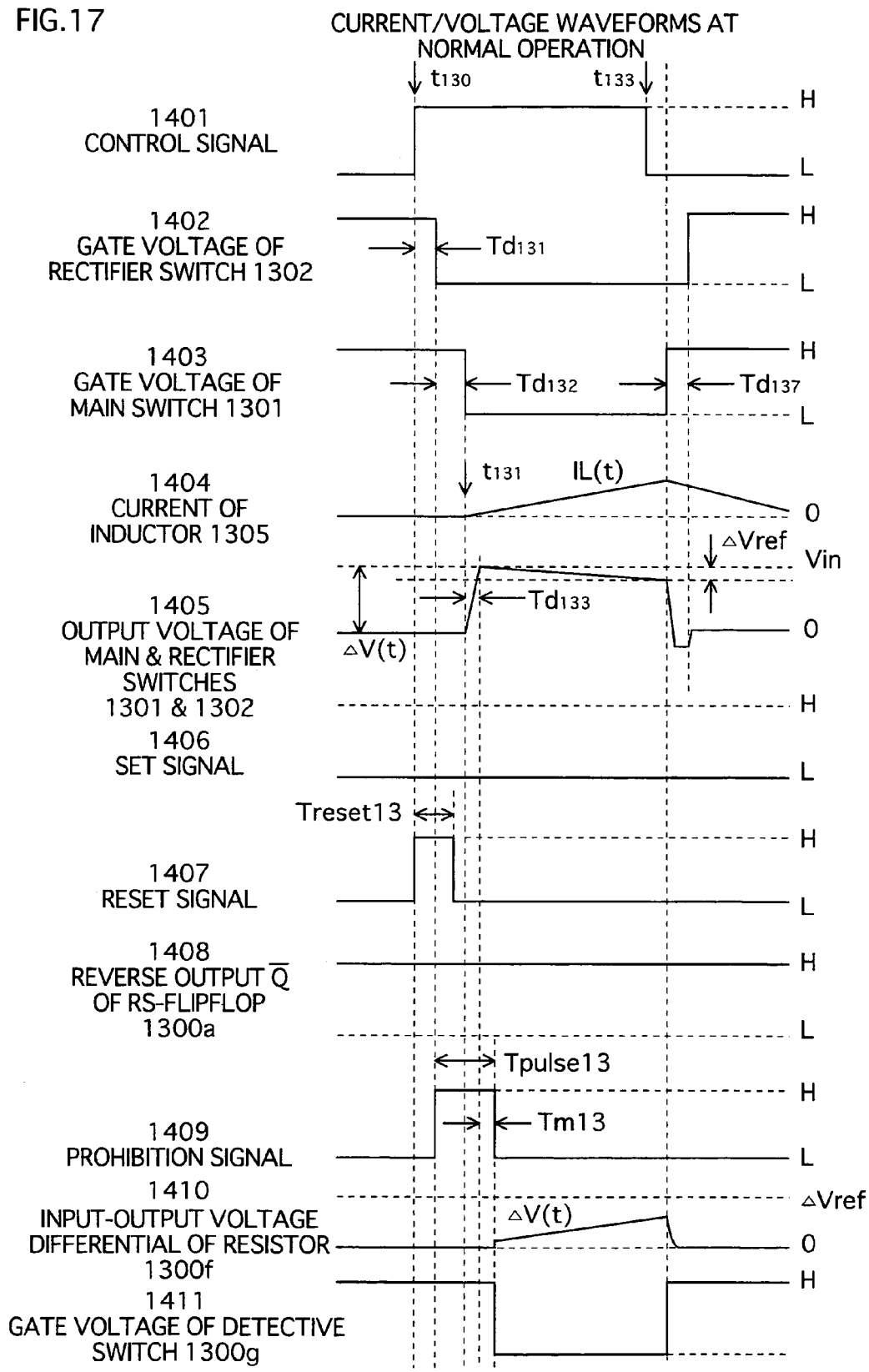
FIG. 17 is a timing chart showing a normal operation of the switching regulator according to the sixth embodiment.

FIG. 17 is a timing chart showing a normal operation of the switching regulator 13. In FIG. 17, the horizontal axis indicates time, and the vertical axis indicates a voltage or a current. Waveform 1401 shows voltage levels of the control signal, Waveform 1402 shows gate-voltage levels of the rectifier switch 1302, Waveform 1403 shows gate-voltage levels of the main switch 1301 and the detective switch 1300g, Waveform 1404 shows the amount of the current flowing through the inductor 1305, Waveform 1405 shows levels of the output voltage provided from a circuit composed of the main switch 1301 and the rectifier switch 1302, Waveform 1406 shows voltage levels of the set signal, Waveform 1407 shows voltage levels of the reset signal, Waveform 1408 shows voltage levels of the reverse output /Q, Waveform 1409 shows voltage levels of the prohibition signal, Waveform 1410 shows voltage levels of the input-output voltage differential $\Delta V_{R1300f}$, and Waveform 1411 shows gate-voltage levels of the detective switch 1300g.

As shown in FIG. 17, at a time $t_{131}$, the gate voltage of the main switch 1301 switches to L (Waveform 1403), and the main switch 1301 is turned on. However, during when the prohibition signal is at H (Waveform 1409), the gate voltage of the detective switch 1300g is kept at H (Waveform 1411) and the input-output voltage differential $\Delta V_{R1300f}$ of the resistor 1300f is kept as 0 V (Waveform 1410).

The gate voltage of the detective switch 1300g switches to L (Waveform 1411), then the input-output voltage differential $\Delta V_{R1300f}$ changes from 0 V to being approximately equal to the voltage drop $\Delta V_{(t)}$ between the output voltage provided from the circuit composed of the main and the rectifier switches 1301 and 1302 and the supply voltage (Waveform 1410).

Accordingly, during when the output voltage provided from the circuit composed of the main switch 1301 and the rectifier switch 1302 increases from L to H, the input-output voltage differential $\Delta V_{R1300f}$ is kept as 0 V. This prevents the judging unit 1300b from erroneously interpreting an overcurrent.

6.2.2 Operation The Time When An overcurrent Occurs

Figure 18:
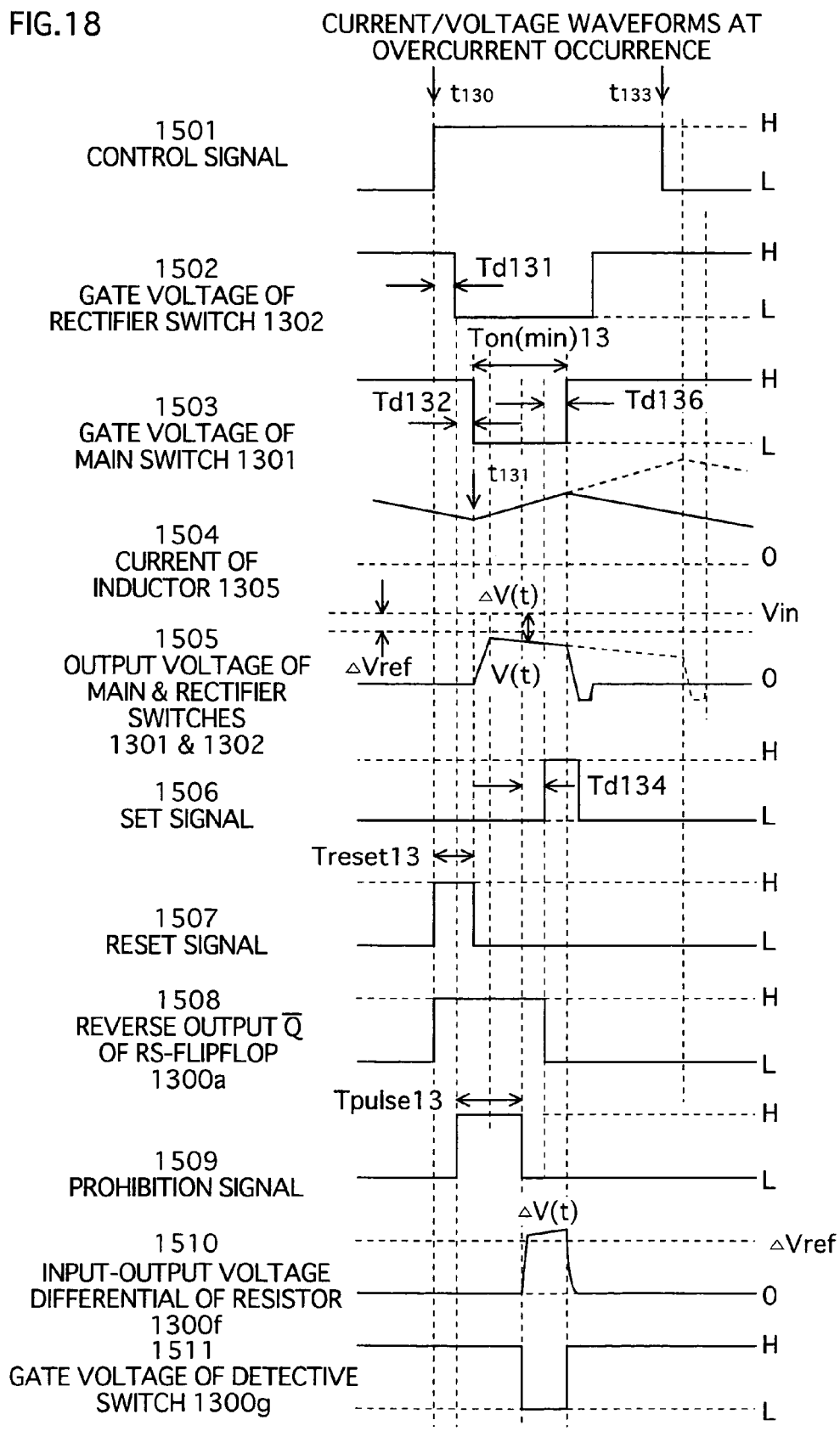
FIG. 18 is a timing chart showing an operation of the switching regulator according to the sixth embodiment performed at the time when an overcurrent occurs.

FIG. 18 is a timing chart showing an operation of the switching regulator 13 performed at the time when an overcurrent occurs. In FIG. 18, the horizontal axis indicates time, and the vertical axis indicates a voltage or a current. Waveform 1501 shows voltage levels of the control signal, Waveform 1502 shows gate-voltage levels of the rectifier switch 1302, Waveform 1503 shows gate-voltage levels of the main switch 1301 and the detective switch 1300g, Waveform 1504 shows the amount of the current flowing through the inductor 1305, Waveform 1505 shows levels of the output voltage provided from the circuit composed of the main switch 1301 and the rectifier switch 1302, Waveform 1506 shows voltage levels of the set signal, Waveform 1507 shows voltage levels of the reset signal, Waveform 1508 shows voltage levels of the reverse output /Q, Waveform 1509 shows voltage levels of the prohibition signal, Waveform 1510 shows voltage levels of the input-output voltage differential $\Delta V_{R1300f}$, and Waveform 1511 shows gate-voltage levels of the detective switch 1300g.

As shown in FIG. 18, from when the main switch 1301 turns on at the time $t_{131}$ (Waveform 1503) until the prohibition signal switches to L (Waveform 1509), the gate voltage of the detective switch 1300g is kept at H (Waveform 1511). Accordingly, because the detective switch 1300g is off during this period, the input-output voltage differential $\Delta V_{R1300f}$ is kept as 0 V (Waveform 1510).

The gate voltage of the detective switch 1300g switches to L (Waveform 1511), and the detective switch 1300g is turned on. Then, the input-output voltage differential $\Delta V_{R1300f}$ increases subsequently to become approximately equal to the voltage drop $\Delta V_{(t)}$ between the output voltage provided from the circuit composed of the main and rectifier switches 1301 and 1302 and the supply voltage (Waveform 1510).

At the time when an overcurrent occurs, the input-output voltage differential $\Delta V_{R1300f}$ is larger than the reference voltage $\Delta V_{ref}$, and the judging unit 1300b sets the set signal at H (Waveform 1506). Herewith, the reverse output /Q switches to L (Waveform 1508) and the main switch 1301 is turned off, and consequently the overcurrent is cut off. Since the detective switch 1300g is also set off in accordance with the cutoff of the overcurrent, the input-output voltage differential $\Delta V_{R1300f}$ becomes 0 V (Waveform 1510).

As described above, according to the present embodiment, the input-output voltage differential $\Delta V_{R1300f}$ is kept as 0 V during when the output voltage provided from the circuit composed of the main switch 1301 and the rectifier switch 1302 increases from L to H because a current is not applied to the resistor 1300f. This prevents an erroneous detection of an overcurrent.

7. Seventh Embodiment

All the embodiments described above exclusively take switching regulators using a buck type converter to illustrate the present invention. In the seventh embodiment, however, a switching regulator using a boost type converter is exemplified to describe the present invention.

7.1 Configuration of Switching Regulator

Figure 19:
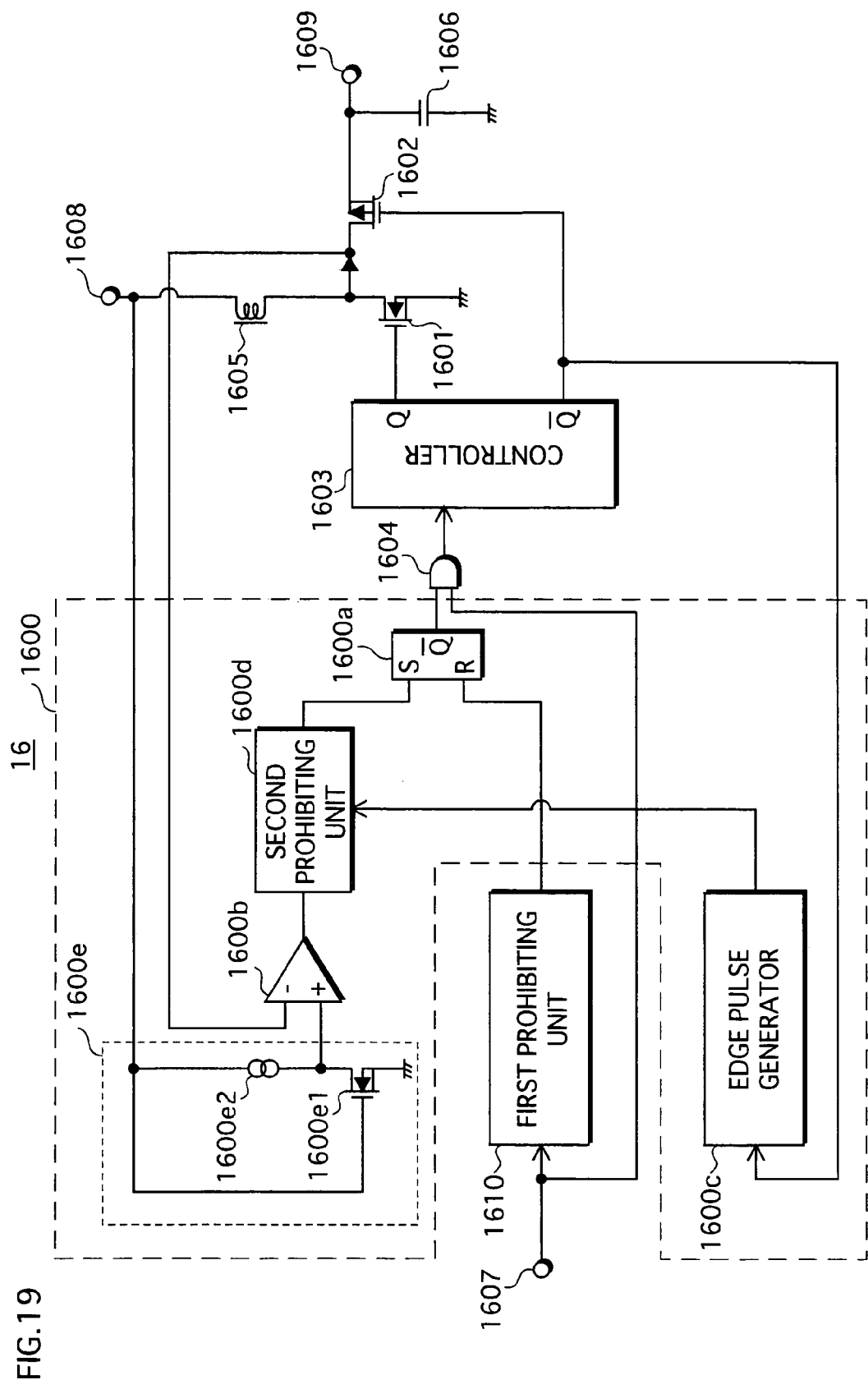
FIG. 19 is a timing circuit showing a configuration of a switching regulator according to a seventh embodiment.

FIG. 19 is a circuit diagram showing a configuration of a switching regulator according to the seventh embodiment. As shown in FIG. 19, the switching regulator 16 comprises an overcurrent protection device 1600, a main switch 1601, a rectifier switch 1602, a controller 1603, an AND circuit 1604, an inductor 1605, a capacitor 1606, a control terminal 1607, an input terminal 1608, an output terminal 1609, and a first prohibiting unit 1610. The main switch 1601 is an N-channel MOSFET while the rectifier switch 1602 is a P-channel MOSFET. A drain terminal of the main switch 1601 is connected to the input terminal 1608 via the inductor 1605 as well as with a drain terminal of the rectifier switch 1602. The source of the main switch 1601 is grounded.

A drain terminal of the rectifier switch 1602 is connected to the input terminal 1608 via the inductor 1605 as well as with the drain terminal of the main switch 1601 and the judging unit 1600b. The judging unit 1600b will hereinafter be described. A source terminal of the rectifier switch 1602 is connected to the output terminal 1609 as well as grounded via the capacitor 1606. To each of the gate terminals of both the main switch 1601 and the rectifier switch 1602, a signal from the controller 1603 is input.

The overcurrent protection device 1600 includes an RS-flipflop 1600a, a judging unit 1600b, an edge pulse generator 1600c, a second prohibiting unit 1600d, and a reference voltage source 1600e. The reference voltage source 1600e includes a switch 1600e1 and a constant current source 1600e2. The switch 1600e1 is an N-channel MOSFET. The switch 1600e1 is connected in series with the constant current source 1600e2, and a gate terminal of the switch 1600e1 is connected to the input terminal 1608.

In a switching regulator using a boost type converter, the output voltage $V_{out}$ can generally be found by the following equation:

$$V_{out}=(T_{on}+T_{off})/T_{off} \cdot V_{in} \quad (22).$$

where $T_{on}$ is the on-time of the main switch 1601 for each cycle, $T_{off}$ is the off-time of the same, and $V_{in}$ is the input voltage of the same.

The switching regulator using a boost type converter keeps the output voltage $V_{out}$ at constant by adjusting the on/off time ratio of the main switch 1601. When an overcurrent occurs, the output voltage $V_{out}$ is lowered by shortening the on-time $T_{on}$, and thereby the output current is controlled. Herewith, the main switch 1601 is protected from breakdown caused by the overcurrent condition.

7.2 Operations of Switching Regulator 16

The following describes operations of the switching regulator 16.

7.2.1 Normal Operation

Figure 20:
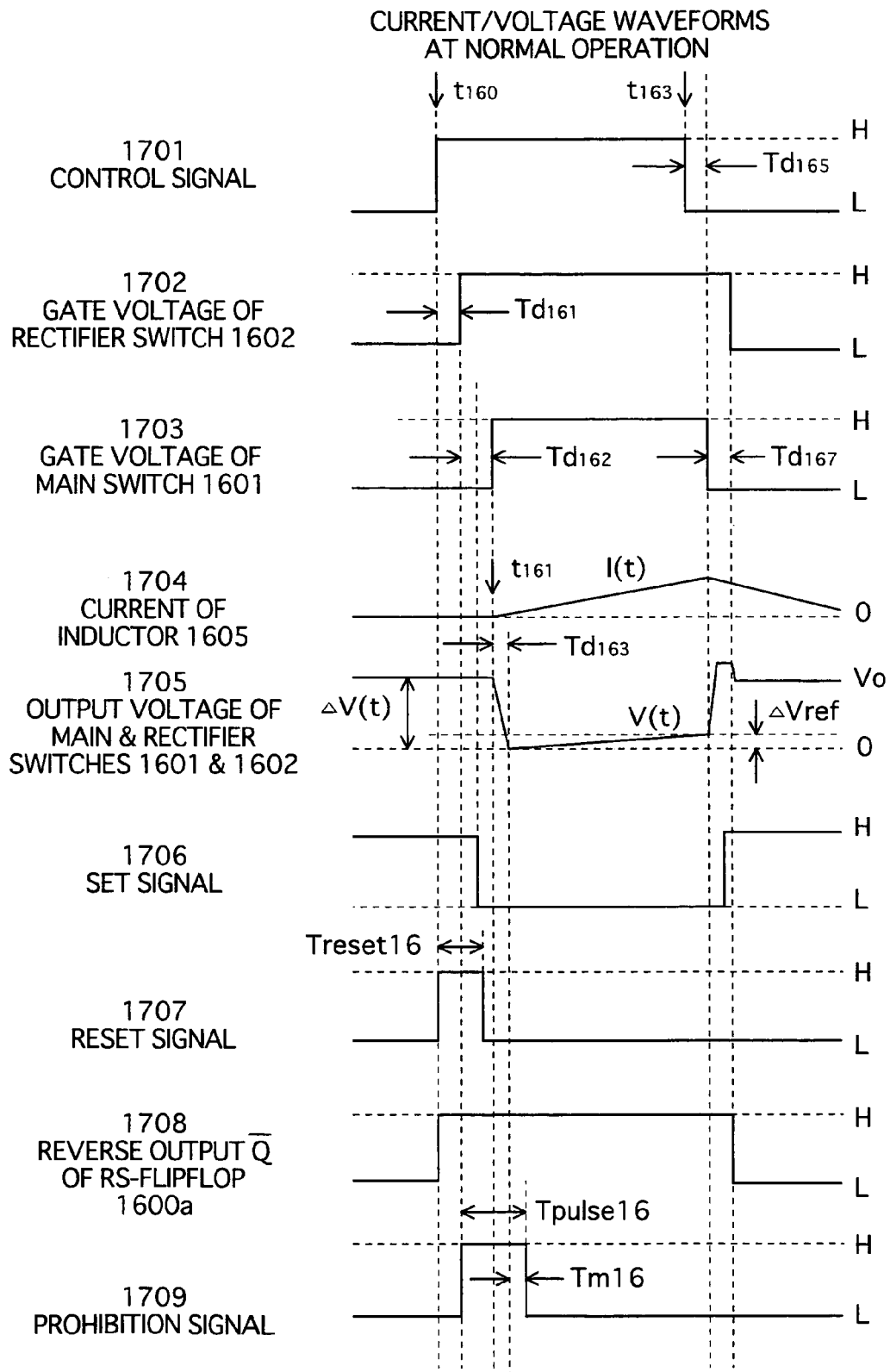
FIG. 20 is a timing chart showing a normal operation of the switching regulator according to the seventh embodiment.

FIG. 20 is a timing chart showing a normal operation of the switching regulator 16 of the seventh embodiment. In FIG. 20, the horizontal axis indicates time, and the vertical axis indicates a voltage or a current. Waveform 1701 shows voltage levels of the control signal, Waveform 1702 shows gate-voltage levels of the rectifier switch 1602, Waveform 1703 shows gate-voltage levels of the main switch 1601, Waveform 1704 shows the amount of the current flowing through the inductor 1605, Waveform 1705 shows levels of the output voltage provided from a circuit composed of the main switch 1601 and the rectifier switch 1602, Waveform 1706 shows voltage levels of the set signal, Waveform 1707 shows voltage levels of the reset signal, Waveform 1708 shows voltage levels of the reverse output /Q, and Waveform 1709 shows voltage levels of the prohibition signal.

As shown in FIG. 20, at a time $(t_{160}+Td_{161})$, the gate voltage of the rectifier switch 1602 switches to H (Waveform 1702) and the rectifier switch 1602 is turned off. At a time $t_{161}$ after a dead-time period $Td_{162}$ for the main switch 1601 and the rectifier switch 1602 has been elapsed, the gate voltage of the main switch 1601 switches to H (Waveform 1703) and the main switch 1601 is turned on.

Because the rectifier switch 1602 is on at the time $t_{160}$, the output voltage provided from the circuit composed of the main switch 1601 and the rectifier switch 1602 (Waveform 1705) becomes approximately equal to the voltage VO of the output terminal 1609. Once the main switch 1601 is turned on at the time $t_{161}$, the output voltage falls close to 0 V during a fall time duration $Td_{163}$. On the other hand, a current $I_{(t)}$ flows through the inductor 1605 (Waveform 1704).

The inductor current $I_{(t)}$ is found by:

$$I_{(t)}=V_{in}/L \cdot (t-t_{161}) \quad (23).$$

Namely, the inductor current $I_{(t)}$ increases with a slope defined by the input terminal voltage $V_{in}$ and an inductance value $L_{1605}$ of the inductor 1605.

The inductor current $I_{(t)}$ flows through the main switch 1601, and then the voltage drop $\Delta V_{(t)}$ between drain and source of the main switch 1601 due to an on-resistance $R_{on160l}$ occurs (Waveform 1705). This voltage drop $\Delta V_{(t)}$ is equal to the output voltage $V_{(t)}$ of the main switch 1601 and the rectifier switch 1602. Namely, $$\Delta V_{(t)} = V_{(t)} \quad (24).$$

In particular, if the main switch 1601 is on, the voltage drop $\Delta V_{(t)}$ is found by:

$$\Delta V_{(t)} = R_{on1601} \cdot I_{(t)} \quad (25).$$

The reference voltage $\Delta V_{ref}$ input to the judging unit 1600b is defined by a voltage drop between drain and source of the switch 1600e1. This voltage drop is caused by an on-resistance $R_{on1600e1}$ of the switch 1600e1 and a current $I_s$ supplied by the constant current source 1600e2. The voltage drop is found by:

$$\Delta V_{ref} = R_{on1600e1} \cdot I_s \quad (26).$$

The judging unit 1600b monitors whether an overcurrent is flowing through the main switch 1601 by comparing the voltage drop $\Delta V_{(t)}$ and the reference voltage $\Delta V_{ref}$.

At a time $(t_{163}+Td_{165})$, the gate voltage of the main switch 1601 switches to L (Waveform 1703) and the main switch 1601 is turned off. After the dead-time period $Td_{167}$ for the main switch 1601 and the rectifier switch 1602 elapses, the gate voltage of the rectifier switch 1602 switches to L (Waveform 1702) and the rectifier switch 1602 is turned on. As a result, energy stored in the inductor 1605 is supplied to the load circuit (not shown) as a current via the rectifier switch 1602.

After the control signal switches to L at the time $t_{163}$ and then the delay time duration $Td_{165}$ elapses, the main switch 1601 is turned off. Thereby, the voltage drop $\Delta V_{(t)}$ exceeds the reference voltage $\Delta V_{ref}$ (Waveform 1705). Then, after a circuit delay time of the judging unit (shorter than the dead-time period $Td_{167}$) elapses, the output of the judging unit 1600b switches to H and the set signal switches to H (Waveform 1706). Herewith, the reverse output /Q is switched to L (Waveform 1708) and then kept at L until the control signal is subsequently switched to H (Waveform 1701).

7.2.2 Operation At The Time When An overcurrent Occurs

The following describes an operation of the switching regulator 16 performed at the time when an overcurrent occurs.

There are two patterns of change in the voltage drop $\Delta V_{(t)}$ during the occurrence of an overcurrent. That is, the first pattern is in which the voltage drop $\Delta V_{(t)}$ once becomes the same or smaller than the reference voltage $\Delta V_{ref}$ (i.e. $\Delta V_{(t)} \leq \Delta V_{ref}$) and then exceeds the reference voltage $\Delta V_{ref}$ ($\Delta V_{(t)} > \Delta V_{ref}$), and the second pattern is in which the voltage drop $\Delta V_{(t)}$ never becomes smaller than the reference voltage $\Delta V_{ref}$ and constantly stays larger than the reference voltage $\Delta V_{ref}$ ($\Delta V_{(t)} > \Delta V_{ref}$). Here, the latter case is taken as an example to describe an operation when an overcurrent occurs.

Figure 21:
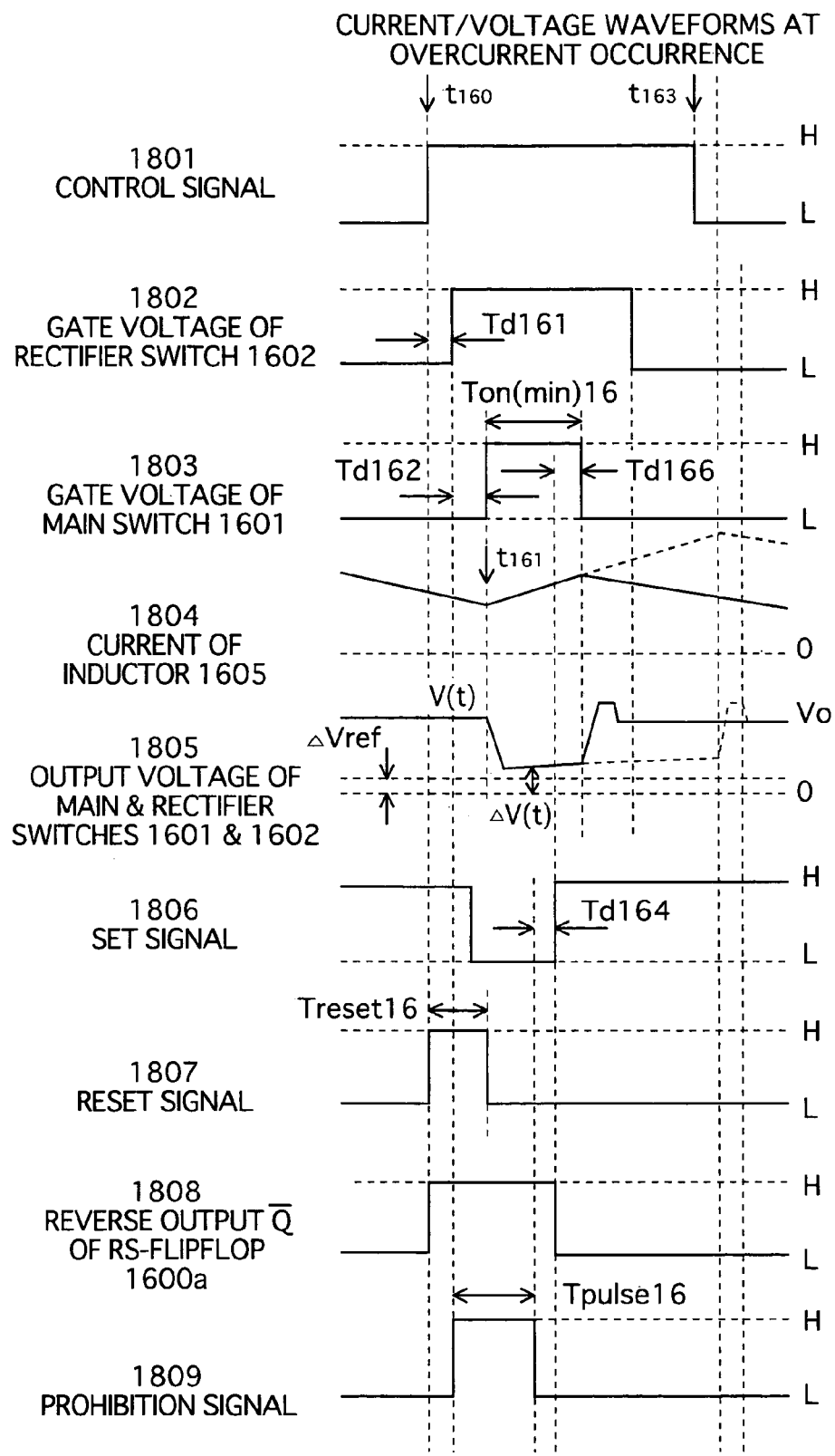
FIG. 21 is a timing chart showing an operation of the switching regulator according to the seventh embodiment performed at the time when an overcurrent occurs.

FIG. 21 is a timing chart showing an operation of the switching regulator 16 of the seventh embodiment. In FIG. 21, the horizontal axis indicates time, and the vertical axis indicates a voltage or a current. Waveform 1801 shows voltage levels of the control signal, Waveform 1802 shows gate-voltage levels of the rectifier switch 1602, Waveform 1803 shows gate-voltage levels of the main switch 1601, Waveform 1804 shows the amount of the current flowing through the inductor 1605, Waveform 1805 shows levels of the output voltage provided from the circuit composed of the main switch 1601 and the rectifier switch 1602, Waveform 1806 shows voltage levels of the set signal, Waveform 1807 shows voltage levels of the reset signal, Waveform 1808 shows voltage levels of the reverse output /Q, and Waveform 1809 shows voltage levels of the prohibition signal.

As shown in FIG. 21, when the gate voltage of the main switch 1601 switches to H (Waveform 180) and the main switch 1601 is turned on, the current $I_{(t)}$ flows through the inductor 1605 (Waveform 1804). Thereby, the voltage drop $\Delta V_{(t)}$ due to the on-resistance of the main switch 1601 occurs (Waveform 1805). The prohibition signal switches to H at the time $(t_{160}+Td_{161})$, and then switches back to L after a time duration $T_{pulse16}$ elapses (Waveform 1809). At this point, the voltage drop $\Delta V_{(t)}$ has become larger than the reference voltage $\Delta V_{ref}$ due to an overcurrent. Therefore, the judging unit 1600b sets the set signal at L (Waveform 1806), and thereby the reverse output /Q switches to L (Waveform 1808) and the main switch 1601 is turned off. Furthermore, after the dead-time period elapses, the rectifier switch 1602 is turned on (Waveform 1802). The rest of the operation is the same as the normal operation.

According to the present embodiment, as in the case of the first embodiment, the overcurrent is cut off at the early stage since the pulse width $T_{reset16}$ of the reset signal of the RS-flipflop 1600a is reduced. In addition, by shortening the minimum on-time $T_{on(min)}$ of the main switch 1601, a total amount of the current flowing during the on-time of the main switch 1601 can be controlled.

As in the case of the fourth embodiment, if the same type of MOSFET as the main switch 1601 is used to generate the reference voltage $\Delta V_{ref}$, the overcurrent condition of the main switch 1601 can be detected with a higher degree of accuracy. As a result, in the switching regulator using a boost type converter also, the present invention is effective in more surely protecting the main switch from breakdown caused by the overcurrent.

8. Modifications

The present invention has been described based on the above embodiments, however it is apparent that the present invention is not confined to these embodiments, and the following modifications can also be implemented.

1 The above embodiments are described taking solely PWM switching regulators as examples. However, the present invention is evidently not confined to these, and can be applied to different types of switching regulators other than the PWM to achieve the effects. Namely, the present invention can be applied to any switching regulator, so long as it is the one supplying a current to a load circuit via a switch that is cyclically turned on and off.

2 The first embodiment above is described taking the case in which the main switch 101 is a P-channel MOSFET as an example. However, the present invention is evidently not confined to this. Switches other than the P-channel MOSFET, such as an N-channel MOSFET and a bipolar transistor, can be used to achieve the same effects. This is also the case with the second to sixth embodiments.

When an N-channel MOSFET is used as a main switch in a switching regulator using a buck type converter, a bootstrap circuit is required in order to gain a drive voltage of the controller. However, regardless of such a difference in the configuration, the present invention can be also applied in this situation to achieve the effects.

3 In the first embodiment above, a signal input to the gate terminal of the rectifier switch 102 is input to the edge pulse generator 100c. However, the present invention is evidently not confined to this, and another signal may be input to the edge pulse generator 100c. For instance, a resistor may be set in a circuit that grounds the source terminal of the rectifier switch 102, and the voltage drop of the resistor may be input to the edge pulse generator 100c. Thus, another signal that has a causal link with a signal of the gate terminal or the drain terminal of the rectifier switch 102 can be input to the edge pulse generator 100c. Herewith, the effects of the present invention can also be achieved.

Also in the second to seventh embodiments, a different signal can be input to the edge pulse generators 500c and 600c after being delayed or reversed. Examples of such a signal are: a control signal, an input signal to the gate terminal of the main switch 501, an output signal from the AND circuit 504, and an output signal from the RS-flipflop 500a. In this case also, the same effects of the present invention can be achieved.

4 In the first embodiment above, the second prohibiting unit 100d includes the switch 100d1. The drain terminal of the switch 100d1 is connected to the circuit connecting the judging unit 100b and the set terminal of the RS-flipflop 100a. Here, the set signal switches to L by turning off the switch 100d1, however the present invention is evidently not confined to this, and the following configurations may be adopted instead.

A drain terminal of a MOSFET is connected to the output terminal of the judging unit 100b while a source terminal of the MOSFET is connected to the set terminal of the RS-flipflop 100a. Here, the set signal can be switched to L by turning off the MOSFET.

Furthermore, instead of switching the set signal to L, the reverse output /Q of the RS-flipflop 100a, the output of the AND circuit 104, or the output of the controller 103 can be cut off or reversed for an appropriate time period by a MOSFET or such.

Herewith, the effects of the present invention can also be achieved. This is also the case with the second to sixth embodiments.

5 In the first embodiment above, the time constant circuit that determines the time duration $T_{pulse1}$, during which the reset signal output from the first prohibiting unit 110 is set at H, comprises a capacitor and a constant current source, and does not include a resistor. However, the present invention is evidently not confined to such a configuration, and the following configurations may be adopted instead.

So called an RC integration circuit having a resistor and a capacitor, or a Schmitt Trigger circuit may be used as the time constant. Furthermore, an oscillation circuit may be composed by adding a transistor, a gate IC, an inductor or a crystal oscillator to such a circuit, and the time period $T_{pulse1}$ may be determined by using the output of the oscillation circuit. Additionally, the output of the oscillation circuit can be divided using a logic circuit for determining the time period $T_{pulse1}$.

This allows for reducing the variations in the delay time duration $T_{pulse1}$, which are attributed to characteristics of the individual components making up the time constant circuit. Accordingly, the margin $Tm_1$ can be shortened, and therefore a protection of the main switch from an overcurrent can be more surely secured. Note that this is also the case with the second to seventh embodiments.

6 The present invention may be accomplished by a combination of two or more of the above embodiments and modifications. In this case also, the effects of the present invention can be achieved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An overcurrent protection device for protecting a main switch of a switching regulator from an overcurrent, the switching regulator supplying a current to a load circuit via the main switch and a rectifier switch which are cyclically turned on and off by a control signal, comprising:
    a judging unit operable to make a judgment whether the overcurrent is flowing through the main switch;
    a controller operable to turn off the main switch when the judging unit judges that the overcurrent is flowing through the main switch;
    a first prohibiting unit operable to prohibit the controller from turning off the main switch during a first time period following after the control signal being output to instruct the controller to turn on the main switch;
    an edge pulse generator operable to detect an edge of an input signal of the rectifier switch, and output a prohibition signal during a second time period following after the main switch being turned on; and
    a second prohibiting unit operable to prohibit the controller from turning off the main switch by providing the prohibition signal wherein
    the second time period starts at or before an end of the first time period, and the first time period ends before an end of the second time period.

2. The overcurrent protection device of claim 1, wherein the judging unit makes the judgment by comparing a voltage corresponding to a current flowing through the main switch with a reference voltage.

3. The overcurrent protection device of claim 1, wherein the second prohibiting unit times the second time period by using a time constant circuit which does not include a resistor.

4. The overcurrent protection device of claim 1, wherein the judging unit includes:
    a comparative switch matching the main switch in terms of electrical characteristics; and
    a constant current source connected in series with the comparative switch, and
the judging unit makes the judgment by comparing a voltage drop across the main switch and a voltage drop across the comparative switch.

5. The overcurrent protection device of claim 1, wherein the judging unit includes:
    a comparative switch integrated on a semiconductor substrate where the main switch is integrated; and
    a constant current source connected in series with the comparative switch, and
the judging unit makes the judgment by comparing a voltage drop across the main switch and a voltage drop across the comparative switch.

6. The overcurrent protection device of claim 1, wherein the judging unit includes:
    a comparative switch matching the main switch in terms of electrical characteristics;

a constant current source connected in series with the comparative switch;

a detective resistor; and a detective switch turned on and off concurrently with the main switch, and making up a series circuit with the detective resistor, the series circuit being connected in parallel with the main switch, and the judging unit makes the judgment by comparing a voltage drop across the detective resistor and a voltage drop across the comparative switch.

7. The overcurrent protection device of claim 1, wherein the judging unit includes:

a comparative switch integrated on a semiconductor substrate where the main switch is integrated;

a constant current source connected in series with the comparative switch;

a detective resistor; and a detective switch turned on and off concurrently with the main switch, and making up a series circuit with the detective resistor, the series circuit being connected in parallel with the main switch, and the judging unit makes the judgment by comparing a voltage drop across the detective resistor and a voltage drop across the comparative switch.

8. The overcurrent protection device of claim 6, further comprising:

a detection stopping unit operable to turn off the detective switch during the second time period.

* * * * *